United States Patent
Watanabe

(10) Patent No.: US 6,862,408 B2
(45) Date of Patent: Mar. 1, 2005

(54) IMAGE PICKUP SYSTEM

(75) Inventor: Masahito Watanabe, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/309,182

(22) Filed: Dec. 4, 2002

(65) Prior Publication Data
US 2003/0138245 A1 Jul. 24, 2003

(30) Foreign Application Priority Data

Dec. 11, 2001 (JP) .......................................... 2001-377264

(51) Int. Cl.$^7$ ............................ G03B 5/00; G02B 3/02; G02B 15/14
(52) U.S. Cl. ....................... 396/72; 359/689; 359/715; 359/716; 359/717
(58) Field of Search ........................................ 359/691

(56) References Cited

U.S. PATENT DOCUMENTS

| 5,801,887 | A | * | 9/1998 | Sato | ............. | 359/691 |
| 6,308,011 | B1 | * | 10/2001 | Wachi et al. | ................. | 396/72 |
| 6,339,509 | B1 | * | 1/2002 | Ohtake | ....................... | 359/689 |
| 6,498,687 | B1 | | 12/2002 | Sekita et al. | | |
| 6,545,819 | B1 | | 4/2003 | Nanba et al. | | |
| 2003/0133201 | A1 | | 7/2003 | Nanba et al. | | |

FOREIGN PATENT DOCUMENTS

| EP | 1 093 000 A2 | 4/2001 |
| EP | 1 096 287 A2 | 5/2001 |
| JP | 2000-111798 | 4/2000 |
| JP | 2001-141997 | 5/2001 |
| JP | 2001-281545 | 10/2001 |
| JP | 2001-296475 | 10/2001 |
| JP | 2001-296476 | 10/2001 |
| JP | 2002-031756 | 1/2002 |

* cited by examiner

Primary Examiner—W. B. Perkey
(74) Attorney, Agent, or Firm—Pillsbury Winthrop LLP

(57) ABSTRACT

The object of the invention is to enhance the performance of an image pickup system comprising a zoom lens by developing an unheard-of design of the configuration of lens surfaces used in the zoom lens, thereby achieving wide-angle arrangements and reductions in the number of lens components used in such a way as to be compatible with various zoom lenses. A zoom lens used on the image pickup system comprises a plurality of lens groups G1 to G4 including a first lens group G1 having negative power and a second lens group G2 having positive power. For zooming, the spaces between the respective lens groups are designed to be variable. The zoom lens further comprises an aperture stop S, and at least one lens group having negative power comprises a negative lens component that is concave on its side facing the aperture stop. The aspheric surface is configured to have refracting power that decreases with an increasing distance from the axial axis of the zoom lens. The zoom lens complies with condition (1) regarding the depth from the apex of the aspheric surface to a position through which the farthest off-axis chief ray passes at the wide-angle end of the zoom lens and condition (2) regarding a local radius of curvature at the apex.

22 Claims, 17 Drawing Sheets

IMAGE PICKUP SYSTEM

This application claims benefit of Japanese Application No. 2001-377264 filed in Japan on Dec. 11, 2001, the contents of which are incorporated by this reference.

BACKGROUND OF THE INVENTION

The present invention relates generally to an image pickup system comprising a zoom lens, and more particularly to a zoom lens having a lens group having negative refracting power as its precedent lens group. Even more particularly, the present invention is concerned with a zoom lens suitable for use with video cameras, digital cameras, etc., in which the lens arrangements of the respective lens groups are properly determined thereby ensuring wider view angles and making the overall lens system small.

With the recent advent of high-performance image pickup systems (cameras) using solid-stage image pickup devices, for instance, video cameras and digital still cameras, wide-angle, high-zoom-ratio zoom lenses are needed for optical systems used therewith. One such typical camera is required to have a relatively long back focus for the purpose of locating various optical members such as low-pass filters between the rearmost portion of the lens system and the image pickup device, and have telecentric capabilities on its image side for the purpose of avoiding shading due to sensitivity with respect to the angle of the image pickup device. However, it has so far been difficult to achieve any desired wide-angle arrangement while these requirements are satisfied.

These requirements may be satisfied by three-group zoom lenses set forth in JP-A's 2000-111798 and 2001-141997. However, the zoom lens set forth in the former publication is found to have some problems such as insufficient correction of aberrations on the peripheral portion of the screen, and little resistance to fabrication errors. Problems with the zoom lens shown in the latter publication, on the other hand, are that because focusing is carried out at the first lens group, the barrel structure becomes complicated and so size reductions become difficult.

SUMMARY OF THE INVENTION

In view of such problems with the prior art as described above, one object of the present invention is to enhance the performance of an image pickup system comprising a zoom lens by developing an unheard-of design of the configuration of lens surfaces used in the zoom lens, thereby achieving wide-angle arrangements and reductions in the number of lens components used in such a way as to be compatible with various zoom lenses. Another object of the present invention is to provide a zoom lens that is made up of a reduced number of lens components so that it is fit for a rear focus mode or other simplified mode in view of mechanism layout, and that is suitable for a wide-angle, high-zoom-ratio zooming mode having stable yet high image-formation capability from infinity to close range.

According to the first aspect of the invention for achieving these objects, there is provided an image pickup system comprising a zoom lens, characterized in that:

said zoom lens comprises a plurality of lens groups including a lens group having negative power and a lens group having positive power wherein, for zooming, the spaces between the respective lens groups are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.30 < a/Rh < 2.50 \tag{1}$$

$$0.30 < Rc/R < 0.95 \tag{2}$$

where $a$ is the absolute value of an axial distance from the apex of the aspheric surface (the point of intersection of the aspheric surface with the optical axis) to a position on the aspheric surface through which a chief ray passes at a maximum view angle at the wide-angle end of the zoom lens, Rh is the absolute value of a distance between the optical axis and a position on the aspheric surface through which an off-axis chief ray passes at a maximum view angle at the wide-angle end of the zoom lens, Rc is the absolute value of the radius of curvature at the apex (the axial radius of curvature of the aspheric surface), and R is the absolute value of a spherical surface having an axis of symmetry defined by the optical axis and including an apex and a position on the aspheric surface through which a chief ray farthest off the optical axis passes, as represented by $R = |(a^2 + Rh^2)/(2a)|$.

According to the second aspect of the present invention, there is provided an image pickup system comprising a zoom lens, characterized in that:

said zoom lens comprises a plurality of lens groups including a lens group having negative power and a lens group having positive power wherein, for zooming, the spaces between the respective lens groups are variable, a negative lens group that is located nearest to the image side of said zoom lens in lens groups having negative powers has an aspheric surface having negative power, and said aspheric surface is configured to comply with the following condition (3):

$$0.70 < Rc/Rh < 1.3 \tag{3}$$

where Rh is the absolute value of a distance between the optical axis and a position on the aspheric surface through which an off-axis chief ray passes at a maximum view angle at the wide-angle end of the zoom lens, and Rc is the absolute value of the radius of curvature at the apex (the axial radius of curvature of the aspheric surface).

According to the third aspect of the present invention, there is provided an image pickup system comprising a zoom lens, characterized in that:

said zoom lens comprises a plurality of lens groups including a lens group having negative power and a lens group having positive power wherein, for zooming, the spaces between the respective lens groups are variable, a negative lens group that is located nearest to the image side of the zoom lens in lens groups having negative powers has an aspheric surface having negative power, and said aspheric surface is configured to comply with the following condition (4):

$$1.3 < Re/Rc < 1.6 \tag{4}$$

where Rc is the absolute value of the radius of curvature at the apex (the axial radius of curvature of the aspheric surface), and Re is the absolute value of a distance from a position on the aspheric surface through which an off-axis chief ray passes at a maximum view angle at the wide-angle end of the zoom lens to a point on the normal where the distance between the normal to the surface at said position and the optical axis becomes shortest.

Why the aforesaid arrangements are used, and how they work is now explained.

The image pickup system of the present invention is constructed using the zoom lens of the present invention, which is improved in terms of wide-angle performance and reduced in the number of lens components yet well corrected for aberrations. The zoom lens of the present invention may be of various types comprising a negative lens group and a positive lens group, for instance, a two- or more-group zoom lens comprising, in order from its object side, a negative lens group and a subsequent lens group having generally positive power as represented by a two-group zoom lens comprising, in order from its object side, a negative and a positive lens group, a three-group zoom lens comprising, in order from its object side, a negative, a positive and a positive lens group and a four-lens group comprising, in order from its object side, a negative, a positive, a positive and a positive lens group; a three-or more-group zoom lens comprising, from its object side, a positive, a negative and a subsequent lens group having generally positive power as represented by a four-group zoom lens comprising, in order from its object side, a positive, a negative, a positive and a positive lens group; and a two-or more-group zoom lens comprising, in order from its object side, a precedent lens group having generally positive power and a negative lens group located nearest to its image side as represented by a two-group zoom lens comprising, in order from its object side, a positive and a negative lens group and a three-group zoom lens comprising, in order from its object side, a positive, a positive and a negative lens group.

In the zoom lens used on the first image pickup system of the present invention, the negative lens component in the negative lens group has an aspheric surface on the side of the aperture stop, which has negative power that becomes weak with an increasing distance form the optical axis of the zoom lens. In addition, that aspheric surface is characterized by being configured to comply with the following conditions (a) and (2).

$$0.30 < a/Rh < 2.50 \quad (1)$$

$$0.30 < Rc/R < 0.95 \quad (2)$$

Here $a$ is the absolute value of an axial distance from the apex of the aspheric surface (the point of intersection of the aspheric surface with the optical axis) to a position on the aspheric surface through which a chief ray passes at a maximum view angle at the wide-angle end of the zoom lens, Rh is the absolute value of a distance between the optical axis and a position on the aspheric surface through which an off-axis chief ray passes at a maximum view angle at the wide-angle end of the zoom lens, Rc is the absolute value of the radius of curvature at the apex (the axial radius of curvature of the aspheric surface), and R is the absolute value of the radius of curvature of a spherical surface having an axis of symmetry defined by the optical axis and including an apex and a position on the aspheric surface through which a chief ray farthest off the optical axis passes, as represented by $R=|(a^2+Rh^2)/(2a)|$.

First of all, the parameters $a$, Rh, Rc and Re (to be referred to later) are explained with reference to FIG. 18. As shown in FIG. 18, the small letter $a$ is the absolute value of an axial distance from the apex of the aspheric surface (the point of intersection of the aspheric surface with the optical axis) to a position on the aspheric surface through which a chief ray passes at a maximum view angle at the wide-angle end of the zoom lens, Rh is the absolute value of a distance between the optical axis and a position on the aspheric surface through which an off-axis chief ray passes at a maximum view angle at the wide-angle end of the zoom lens, Rc is the absolute value of the radius of curvature at the apex (the axial radius of curvature of the aspheric surface), and Re is the absolute value of a distance from a position on the aspheric surface through which an off-axis chief ray passes at a maximum view angle at the wide-angle end of the zoom lens to a point on the normal where the distance between the normal to the surface at said position and the optical axis becomes shortest (in FIG. 18, Re is the distance from said position to the point of intersection of the normal with the optical axis). The capital letter R is the absolute value of the radius of curvature of a spherical surface (with the center of curvature found on the optical axis) having an axis of symmetry defined by the optical axis and including an apex and a position on the aspheric surface through which a chief ray farthest off the optical axis passes at the wide-angle end of the zoom lens. From simple geometry, $$R=|(a^2+Rh^2)/(2a)|.$$

Condition (1) gives a definition of the depth from the apex of the aspheric surface to the position through which the farthest off-axis chief ray passes at the wide-angle end of the zoom lens (when the stop is located on the image side of the zoom lens) or the depth from the position through the farthest off-axis chief ray passes at the wide-angle end to the apex of the aspheric surface (when the stop is located on the object side of the zoom lens). This condition means that to ensure the light quantity of the farthest off-axis light beam at the wide-angle end of the zoom lens, it is required to tilt the peripheral portion, on which that light beam is incident, of the aspheric surface in a considerable amount with respect to the stop side. As the lower limit of 0.30 to this condition is not reached, the depth becomes so short that the angle of incidence of the farthest off-axis light beam at the wide-angle end becomes large, resulting in under-correction of off-axis aberrations. As the upper limit of 2.50 is exceeded, on the other hand, the quantity of rim rays tends to increase due to too considerable a depth and it is difficult to ensure aspheric surface precision.

Condition (2) defines a local radius of curvature of the apex of the aspheric surface; condition (2) is provided to correct the aspheric surface well for aberrations from its central to peripheral portions at an increased view angle at the wide-angle end of the zoom lens. In other words, this condition means that the negative power of the central portion of the aspheric surface is stronger than that of the rest. As the lower limit of 0.30 to this condition is not reached or the radius of curvature of the apex becomes small, or as the upper limit of 0.95 is exceeded or the radius of the curvature of the apex becomes large, it is difficult to keep spherical aberrations satisfactorily.

According to the present invention wherein such an aspheric surface is configured to be concave with respect to the stop, aberrations can be well corrected in a wide-angle arrangement and the quantity of rim rays can be well secured while strong negative power remains imparted to the concave surface. This can in turn lead to the achievement of a zoom lens that, albeit being constructed of a reduced number of lens components, can maintain improved performance even at an increased view angle at the wide-angle end thereof More preferably in condition (1), the lower limit should be set at 0.35 or 0.39 and the upper limit at 1.00 or 0.70. For instance, $$0.35 < a/Rh < 1.00 \quad (1)$$

More preferably in condition (2), the lower limit should be fixed at 0.50 or 0.80 and the upper limit at 0.90 or 0.85. For instance, $$0.50 < Rc/R < 0.90 \quad (2)$$

It is also preferable to comply with the following condition (3).

$$0.70 < Rc/Rh < 1.3 \quad (3)$$

Condition (3) defines the axial radius of curvature of the aspheric surface on the basis of the position (Rh) through which the farthest off-axis chief ray passes, meaning that the quantity of an off-axis light beam is ensured by proper determination of the radius of curvature of the central portion of the aspheric surface.

As the upper limit of 1.3 to condition (3) is exceeded, it is difficult to make the view angle wide at the wide-angle end while distortions are held back. Conversely, any failure in meeting the lower limit of 0.70 is not favorable for size reductions because the diameter of the negative lens group becomes too large.

More preferably in condition (3), the lower limit should be set at 0.8 or 0.88 and the upper limit at 1.24 or 1.0.

As a matter of course, the requirement for the aspheric surface according to the first aspect of the present invention should preferably be satisfied at the same time for the purpose of achieving an image pickup system having much higher performance.

Furthermore, it is preferable to comply with the following condition (4).

$$1.3 < Re/Rc < 1.6 \quad (4)$$

Here Re is the absolute value of a distance from a position on the aspheric surface through which an off-axis chief ray passes at a maximum view angle at the wide-angle end of the zoom lens to a point on the normal where the distance between the normal to the surface at said position and the optical axis becomes shortest (see FIG. 18).

This condition defines that the radius of curvature (Rc) of a peripheral portion of the aspheric surface is much larger than that of the central portion of the aspheric surface.

While some ample wide-angle is ensured, it is very difficult to reduce chromatic aberration of magnification, distortion and astigmatism at the same time. By introduction of an aspheric surface capable of satisfying the upper and the lower limit to condition (4), it is possible to reduce chromatic aberration of magnification, distortion and astigmatism at the same time while some ample wide-angle is achieved.

More preferably in this condition, the lower limit should be set at 1.32 or 1.34 and the upper limit at 1.5 or 1.4.

As a matter of course, the requirement for the aspheric surface according to the first or second aspect of the present invention should preferably be satisfied at the same time for the purpose of achieving an image pickup system having much higher performance.

Preferably in the zoom lens of the present invention, the relative distance between the stop and the aspheric surface should be shorter at the telephoto end than at the wide-angle end.

With this arrangement, the position through which an off-axis light beam passes at the telephoto end can be brought nearer to the optical axis side with respect to the position through which an off-axis light beam passes at the wide-angle end, so that it is possible to prevent aberrations from becoming worse at the telephoto end where the view angle becomes narrow.

In one specific embodiment of the present invention, the zoom lens comprises, in order from its object side, a first lens group having negative power and a subsequent lens group having generally positive refracting power, with an aspheric surface disposed in the first lens group.

Used at a position where an axial light beam and an off-axis light beam are spaced away from each other at the wide-angle end, the aspheric surface of the present invention can contribute well to correction of aberrations in a wide-angle arrangement. In view of reductions in the number of lens components and correction of aberrations, it is thus more preferable to use the aspheric surface in the first lens group of the zoom lens in which the negative lens group is positioned nearest to the object side of the zoom lens.

Preferably in this embodiment, the subsequent lens group should comprise, in order from its object side, a second lens group having positive power and a third lens group having positive power, wherein, upon zooming from the wide-angle end to the telephoto end of the zoom lens, the space between the first lens group and the second lens group becomes narrow, and the stop is interposed between the first lens group and the third lens group.

In the case of a three-group zoom lens arrangement comprising a negative, a positive and a positive lens group, it is preferable for correction of off-axis aberrations to use the aspheric surface of the present invention in the first lens group, because the negative power concentrates on the first lens group. In this arrangement, the stop is located in the vicinity of the center of the whole zoom lens, so that any increase in the diameter of the first lens group is reduced and a light beam emerging from the zoom lens is approximately parallel with the optical system. Thus, this zoom lens arrangement is particularly suited for use with an electronic image pickup system. At the same time, since an off-axis light beam is incident at a small angle of incidence on the aspheric surface at the wide-angle end, a sensible tradeoff can be made between correction of aberrations and size reductions. Also, since the space between the first lens group and the second lens group becomes narrow upon zooming from the wide-angle end to the telephoto end, it is possible to ensure space large enough for movement of the stop.

The subsequent lens group may comprise, in order from its object side, a second lens group having positive power, a third lens group having positive power and a fourth lens group having positive or negative power, with a stop interposed between the first lens group and the third lens group.

By adding the fourth lens group to the aforesaid three-group zoom lens arrangement, the zoom ratio can be increased with improved effects on correction of aberrations.

In another specific embodiment of the present invention, the zoom lens comprises, in order from its object side, a first lens group having negative power, an aperture stop, a second lens group having positive power and a third lens group having positive power. The first lens group, and the second lens group has an aspheric lens component. The first lens group comprises at least one negative meniscus lens component convex on its object side and a positive lens component, and the second lens group comprises a doublet component consisting of a positive lens element and a negative lens element, and a positive lens component.

In yet another embodiment of the present invention, the zoom lens comprises, in order from its object side, a first lens group having negative power, an aperture stop, a second lens group having positive power and a third lens group having positive power. The fist lens group, and the second lens group has an aspheric lens component. The first lens group comprises at least one negative meniscus lens component convex on its object side and a positive lens component, and the second lens group comprises a doublet component consisting of a positive lens element and a negative lens element, and two positive lens components.

With the second lens group comprising a triplet consisting of a positive, a negative and a positive lens element or a positive, a positive, a negative and a positive lens component, a zoom ratio of 3 or greater can be ensured while aberrations are well corrected. By cementing together the positive and negative lens elements in the second lens group, it is also possible to set up an optical system that can be corrected for chromatic aberrations and resistant to fabrication errors.

Preferably in the aforesaid arrangement, the third lens group should have therein a positive lens component that complies with the following condition (5).

$$\nu_3 > 49 \tag{5}$$

Here $\nu_3$ is the d-line reference Abbe number of any of the positive lens components in the third lens group.

By constructing the third lens group of a low-dispersion glass that satisfies condition (5), an increased view angle is achievable while chromatic aberration of magnification is well corrected.

It is also preferable that the third lens group comprises a doublet component consisting of a negative lens element and a positive lens element.

By constructing the third lens group of a doublet component consisting of a negative lens element and a positive lens element, an increased view angle is achievable while chromatic aberration of magnification is well corrected.

More preferably, $\nu_3 > 60$, and even more preferably, $\nu_3 < 90$. Lens materials with $\nu_3 > 90$ cost much.

The shape of the doublet component that forms a part of the second lens group should preferably comply with the following condition (6).

$$0.6 < R_{23}/R_{21} < 1.0 \tag{6}$$

Here $R_{21}$ is the radius of curvature of the side of the doublet component, which is located nearest to the object side of the zoom lens, and $R_{23}$ is the radius of curvature of the side of the doublet component, which is located nearest to the image plane side of the zoom lens.

When the ratio between the radius of curvature of the side of the doublet component which is located nearest to the object side and the radius of curvature of the side of the doublet component which is located nearest to the image plane side departs from the range defined by condition (6), the performance of the whole doublet component is susceptible to deterioration due to decentration.

More preferably, the lower limit to this condition should be set at 0.65 or 0.7 and the upper limit at 0.95 or 0.9.

It is also preferable that the shape of the cemented surface of the doublet component in the second lens group complies with the following condition (7).

$$-0.1 < f_W/R_{22} < 0.2 \tag{7}$$

Here $R_{22}$ is the radius of curvature of the cemented surface of the doublet component, and $f_W$ is the focal length of the zoom lens at its wide-angle end.

To keep chromatic aberration of magnification small all over the zooming zone, it is preferable to satisfy the range defined by the upper limit of 0.2 and the lower limit of −0.1 to condition (7).

More preferably in condition (7), the lower limit should be set at −0.5 or 0.001 and the upper limit at 0.1 to 0.05.

In this connection, it is preferable to satisfy condition (7) when the zoom lens has a high zoom ratio ranging from 2.7 to 6.0, because chromatic aberrations can be well corrected all over the zooming zone.

It is also preferable to meet the following condition (8).

$$2.6 < f_2/f_W < 4.0 \tag{8}$$

Here $f_2$ is the focal length of the second lens group, and $f_W$ is the focal length of the zoom lens at its wide-angle end.

Exceeding the upper limit of 4.0 to condition (8) is not preferable for slimming down an associated camera because the zoom lens is likely to become long. As the lower limit of 2.6 is not reached, it is not only difficult to reduce off-axis aberrations but the second lens group is also susceptible to fabrication errors.

More preferably in this condition, the lower limit should be fixed at 2.9 or 3.2 and the upper limit at 3.7 or 3.5.

In this connection, it is preferable to meet condition (8) when the zoom lens has a high zoom ratio ranging from 2.8 to 6.0, because size reductions and correction of aberrations can be well balanced all over the zooming zone.

It is also preferable to comply with the following condition (9).

$$2.0 < |f_1|/Y < 5.0 \tag{9}$$

Here $f_1$ is the focal length of the first lens group, and Y is ½ of an effective diagonal length of an image pickup surface.

As the upper limit of 5.0 to condition (9) is exceeded, the length of the zoom lens must be increased to make sure of any desired zoom ratio. As the lower limit of 2.0 is not reached, correction of chromatic aberration of magnification becomes difficult.

More preferably, the lower limit to this condition should be set at 2.5 or 3.2 and the upper limit at 4.7 or 4.5.

The effective diagonal length L is now explained. FIG. 19 is illustrative of the diagonal length of an effective image pickup surface in the case where an image pickup surface is defined by an electronic image pickup device. The "effective image pickup surface" used herein is understood to refer to an area within a photoelectric conversion surface on an image pickup device that is used for reconstruction of a phototaken image (e.g., image reconstruction on personal computers or by printers). The effective image pickup surface shown in FIG. 19 is consistent with the performance of an optical system (an image circle achievable by the performance of the optical system), and so is set at an area narrower than the total photoelectric conversion surface of the image pickup device. The diagonal length L referred to herein is that of this effective image pickup surface. While the image pickup range used for image reconstruction is variously variable, it is understood that when the zoom lens of the present invention is used with an image pickup system having such functions, the diagonal length L of that effective image pickup surface varies. In such a case, the diagonal length of the image pickup surface is defined by a maximum value in the widest possible range for L. It is noted that FIG. 19 shows an exemplary pixel array wherein R (red), G (green) and G (blue) pixels or cyan, magenta, yellow and green pixels are arranged at pixel intervals a.

When the image pickup surface is defined by a film surface, the aforesaid Y is half the diagonal length of a field stop located just before an assumed film surface for controlling an image pickup range.

It is preferable that while an electronic image pickup device is located on the image side of the zoom lens, the following condition (10) is satisfied.

$$0.7 < f_W/ER_3 < 1.2 \qquad (10)$$

Here $f_W$ is the focal length of the zoom lens at its wide-angle end, and $ER_3$ is a distance from the optical axis to a point where at the lens group located nearest to the image plane side of the zoom lens a light ray is farthest off the optical axis at the telephoto end.

As the upper limit of 1.2 to condition (10) is exceeded, the quantity of rim rays tends to become insufficient partly by virtue of the sensitivity of the image pickup device. As the lower limit of 0.7 is not reached, it is difficult to correct the zoom lens for coma and astigmatism upon widening of the view angle.

More preferably in this condition, the lower limit should be set at 0.8 or 0.9 and the upper limit at 1.15 or 1.00.

It is here noted that this condition should preferably be satisfied when the zoom lens has a high zoom ratio ranging from 2.7 to 6.0, because satisfactory performance is achievable all over the zooming zone.

In a further embodiment of the present invention, the zoom lens comprises, in order from its object side, a first lens group having positive power, a second lens group having negative power and a subsequent lens group having generally positive refracting power. Upon zooming from the wide-angle end to the telephoto end of the zoom lens, the space between the first lens group and the second lens group becomes wide, and an aspheric surface is incorporated in the second lens group.

With this arrangement, high zoom ratios are achievable because a main zooming action can be allocated to the negative lens component in the second lens group. By incorporating the aspheric surface of the present invention in the second lens group, on the other hand, the second lens group itself can make satisfactory correction for aberrations. It is thus possible to simplify the lens arrangement of the first lens group (for instance, construct it of one or two lens components).

In this embodiment, the subsequent lens group may comprise, in order from its object side, a third lens group having positive power and a fourth lens group having positive or negative power. Upon zooming from the wide-angle end to the telephoto end of the zoom lens, the space between the second lens group and the third lens group becomes narrow, and the stop is interposed between the second lens group and the fourth lens group.

Because the space between the second lens group and the third lens group becomes narrow upon zooming from the wide-angle end to the telephoto end and so it is possible to ensure space large enough to move the space, this embodiment is more preferable.

In the aforesaid embodiment of the present invention, the negative lens component including an aspheric surface may be formed of a negative meniscus lens that is convex on its side facing away from the stop.

The central portion of the aspheric surface is so strong that when the negative lens component is configured to be concave on that side, its central portion becomes too strong and, hence, its peripheral portion becomes thick. For this reason, it is preferable to configure the negative lens component having an aspheric surface in a meniscus form.

More preferably, the negative lens component should be configured in a meniscus shape that complies with both the following conditions (A) and (B).

$$1.2 < (Ra+Rc)/(Ra-Rc) < 3.0 \qquad (A)$$

$$2.0 < Ra/Rc < 20.0 \qquad (B)$$

Here Ra is the axial radius of curvature of a surface of the lens component having an aspheric surface, said surface contacting air and being opposite to said aspheric surface, and Rc is the absolute value of the radius of curvature at an aspheric surface apex (the axial radius of curvature of said aspheric surface).

As the lower limit of 1.2 to condition (A) is not reached, it is difficult to correct the surface opposite to the aspheric surface for aberrations. As the upper limit of 3.0 is exceeded, the shape of the negative lens component becomes too steep for processing.

More preferably in condition (A), the lower limit should be set at 1.3 or 1.5 and the upper limit at 2.3 or 1.7.

As the lower limit of 2.0 to condition (B) is not reached, much difficulty is experienced in lens processing, and as the upper limit of 20.0 is exceeded, the peripheral portion of the lens component becomes thick.

More preferably in condition (B), the lower limit should be set at 2.5 or 4.5 and the upper limit at 15.0 or 10.0.

In a further embodiment of the present invention, the negative lens group including an aspheric surface may comprise one positive lens component that is concave toward the stop, and one or two negative lens components.

Preferably, the half view angle of the zoom lens at its wide-angle end should be in the range of 35° to 50° inclusive.

As the half view angle is smaller than the lower limit of 35°, any phototaking view angle desired for common image pickup systems cannot be obtained. Nor is the aspheric surface of the present invention useful for enhancing the peripheral performance. As the upper limit of 50° is exceeded, correction of aberrations becomes difficult unless the number of lens components is increased.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

The zoom lens used with the image pickup system of the invention is now explained with reference to Examples 1 to 8.

Lens arrangements for Examples 1 to 8 upon focused on an object point at infinity at their wide-angle end (a), in their intermediate state (b) and at their telephoto end (c), respectively, are shown in section in FIGS. 1 to 8, wherein G1 is the first lens group, S the stop, G2 the second lens group, G3 the third lens group, G4 the fourth lens group, P an infrared cut filter, a low-pass filter, and a plane-parallel plate such as cover glass for an electronic image pickup device, and I an image plane.

EXAMPLE 1

Figure 1A:
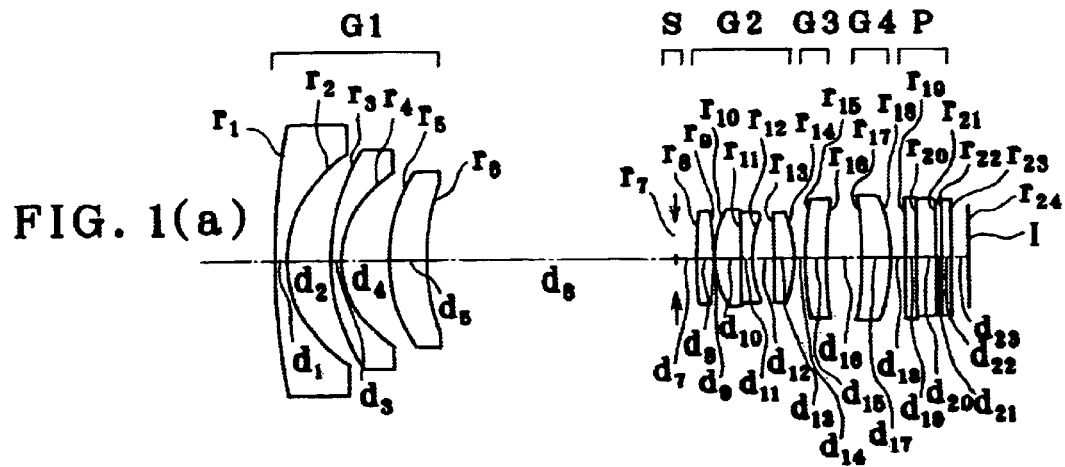
FIGS. 1(a), 1(b) and 1(c) are illustrative in section of lens arrangements in Example 1 of the zoom lens used with the image pickup system of the present invention upon focused on an object point at infinity, at its wide-angle end (a), in its intermediate state (b) and at its telephoto end (c), respectively.
Figure 1B:
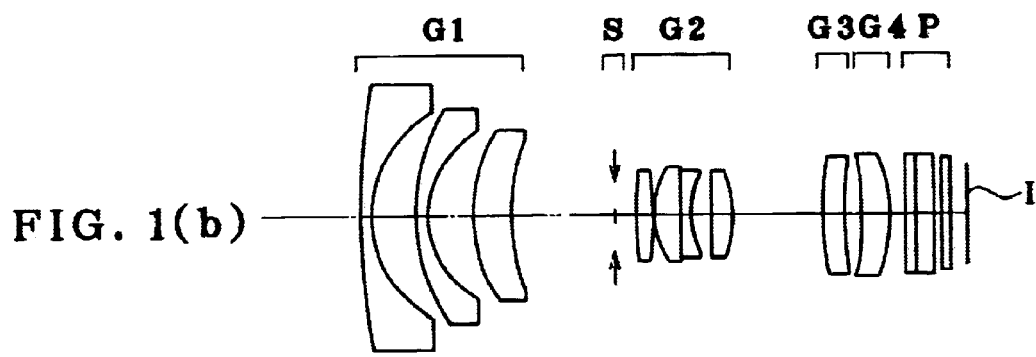
Figure 1C:
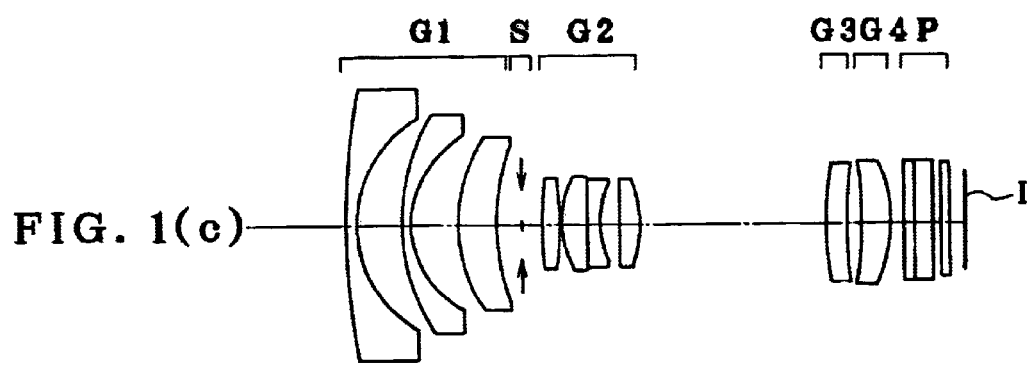

As shown in FIG. 1, the zoom lens of this example is made up of a first lens group G1 that has negative refracting power and consists of two negative meniscus lenses each convex on its object side and a positive meniscus lens convex on its object side, an aperture stop S. a second lens group G2 that has positive refracting power and is composed of a double-convex positive lens, a doublet consisting of a positive meniscus lens convex on its object side and a negative meniscus lens convex on its object side and a positive meniscus lens convex on its image plane side, a third lens group G3 that has positive refracting power and consists of a positive meniscus lens convex on its object side, and a fourth lens group G4 that has positive refracting power and consists of one positive meniscus lens convex on its image plane side. Upon zooming from the wide-angle end to the telephoto end of the zoom lens, the first lens group G1 moves on a concave track toward the object side of the zoom lens, arriving at the telephoto end where it is positioned nearer to the image plane side than at the wide-angle end. The second lens group G3 moves together with the aperture stop S toward the object side and the third lens group G3 moves toward the image plane side while the fourth lens group G4 remains fixed.

Three aspheric surfaces are used, one at the image plane-side surface of the second negative meniscus lens in the first lens group G1, one at the surface of the second lens group G2 which is located nearest to the object side of the zoom lens, and one at the object-side surface of the single lens in the fourth lens group G4.

EXAMPLE 2

Figure 2A:
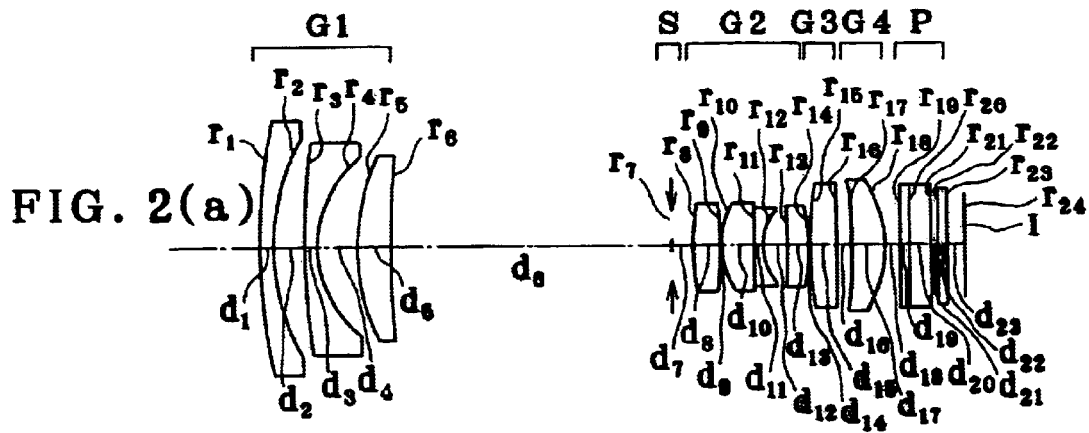
FIGS. 2(a), 2(b) and 2(c) are views, similar to FIGS. 1(a), 1(b) and 1(c), of Example 2 of the zoom lens of the present invention.
Figure 2B:
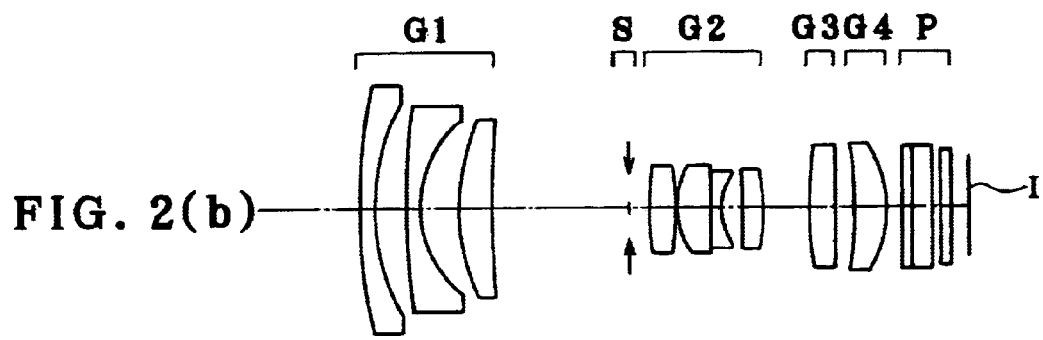
Figure 2C:
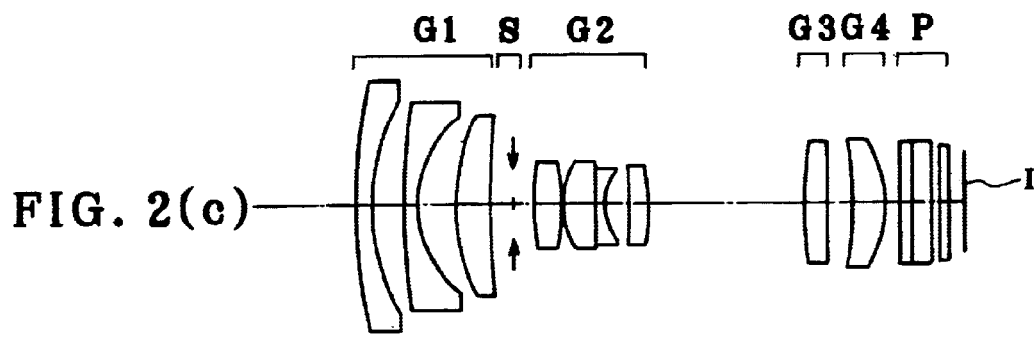

As shown in FIG. 2, the zoom lens of this example is made up of a first lens group G1 that has negative refracting power and consists of two negative meniscus lenses each convex on its object side and a positive meniscus lens convex on its object side, an aperture stop S, a second lens group G2 that has positive refracting power and is composed of a double-convex positive lens, a doublet consisting of a positive meniscus lens convex on its object side and a negative meniscus lens convex on its image plane side, a third lens group G3 that has positive refracting power and consisting of one positive meniscus lens convex on its object side, and a fourth lens group G4 that has positive refracting power and consists of one positive meniscus lens convex on its image plane side. Upon zooming from the wide-angle end to the telephoto end of the zoom lens, the first lens group G1 moves on a concave track toward the object side, arriving at the telephoto end where it is positioned slightly nearer to the object side than in the intermediate state. The second lens group G2 moves together with the apertures stop S toward the object side and the third lens group G3 moves slightly toward the object side while the fourth lens group G4 remains fixed.

Three aspheric surfaces are used, one at the image plane side of the second negative meniscus lens in the first lens group G1, one at the surface of the second lens group G2, which is located nearest to the object side of the zoom lens, and one at the object-side surface of the single lens in the fourth lens group G4.

EXAMPLE 3

Figure 3A:
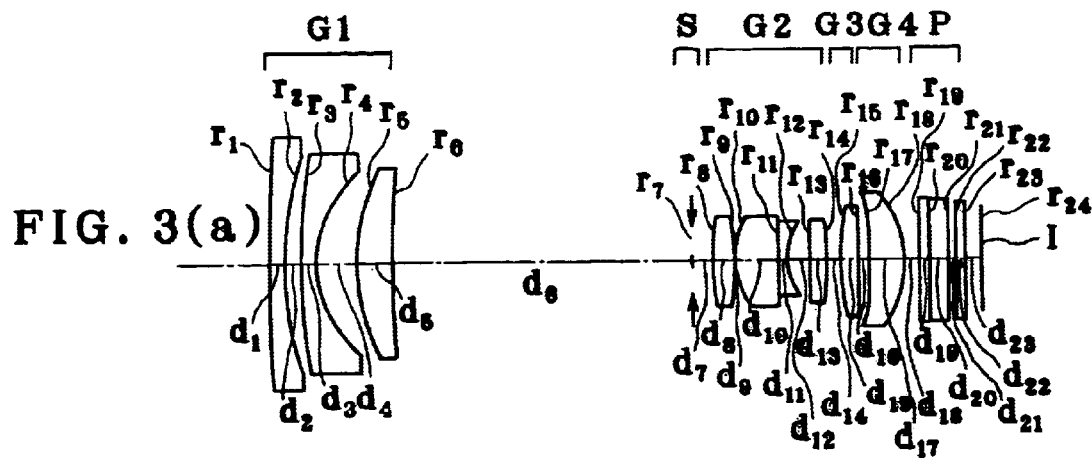
FIGS. 3(a), 3(b) and 3(c) are views, similar to FIGS. 1(a), 1(b) and 1(c), of Example 3 of the zoom lens of the present invention.
Figure 3B:
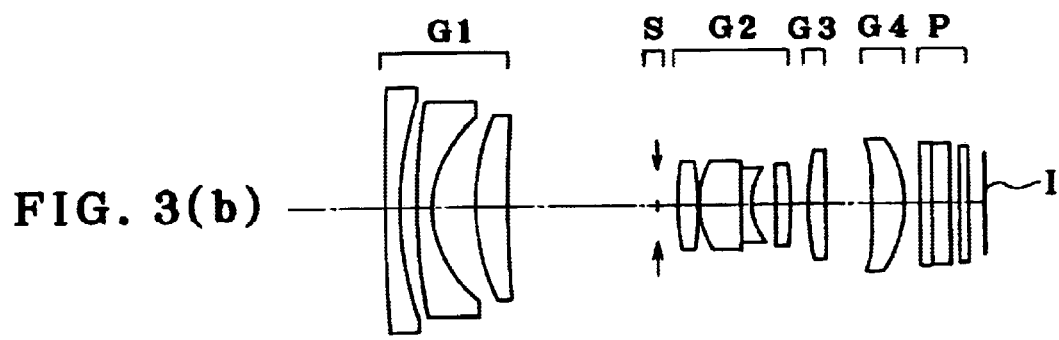
Figure 3C:
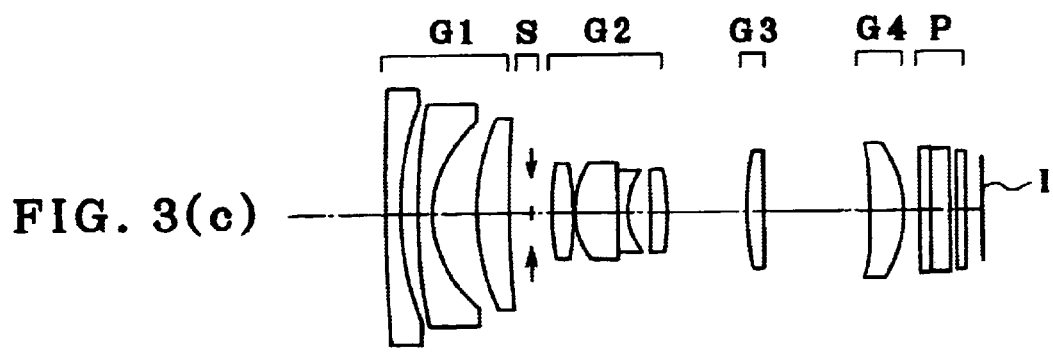

As shown in FIG. 3, the zoom lens of this example is made up of a first lens group G1 that has negative refracting power and consists of two negative meniscus lenses each convex on its object side and a positive meniscus lens convex on its object side, an aperture stop S, a second lens group G2 that has positive refracting power and is composed of a double-convex positive lens, a doublet consisting of a positive meniscus lens convex on its object side and a negative meniscus lens convex on its image plane side, a third lens group G3 that has positive refracting power and consists of one positive meniscus lens convex on its image plane side, and a fourth lens group G4 that has positive refracting power and consists of one positive meniscus lens convex on its image plane side. Upon zooming from the wide-angle end to the telephoto end of the zoom lens, the first lens group G1 moves toward the image plane side. The second lens group G2 moves together with the aperture stop S toward the object side and the third lens group moves toward the object side with an increasing space between the second lens group G2 and the third lens group G3, while the fourth lens group G4 remains fixed.

Three aspheric surfaces are used, one at the image plane side of the second negative meniscus lens in the first lens group G1, one at the surface of the second lens group G2, which is located nearest to the object side of the zoom lens, and one at the object-side surface of the single lens in the fourth lens group G4.

EXAMPLE 4

Figure 4A:
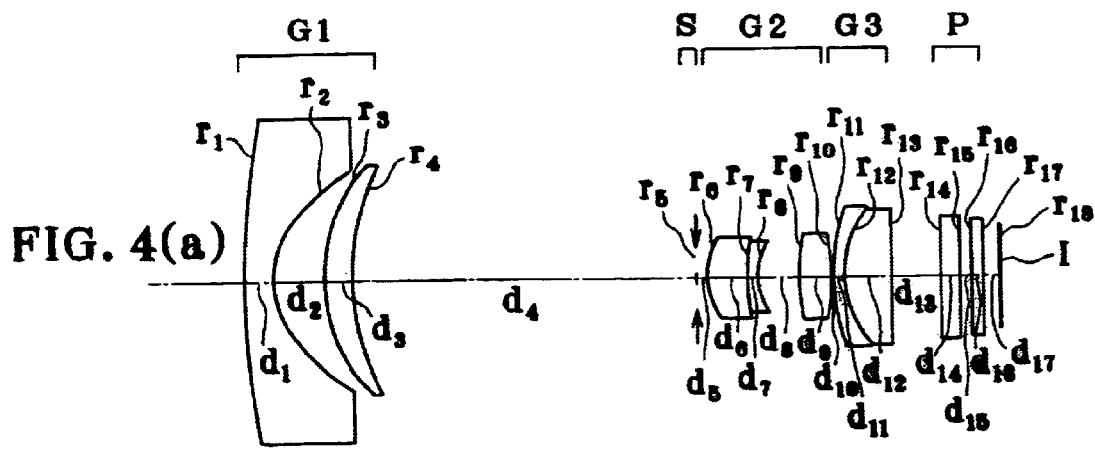
FIGS. 4(a), 4(b) and 4(c) are views, similar to FIGS. 1(a), 1(b) and 1(c), of Example 4 of the zoom lens of the present invention.
Figure 4B:
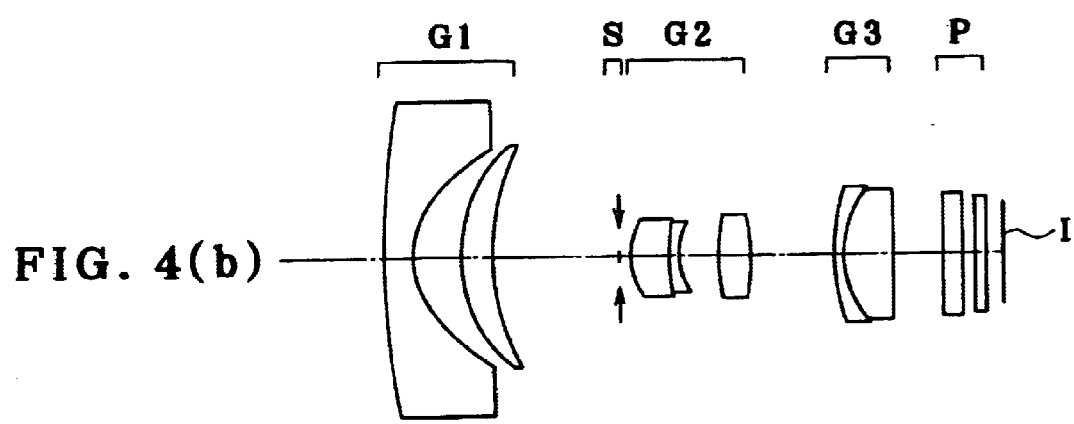
Figure 4C:
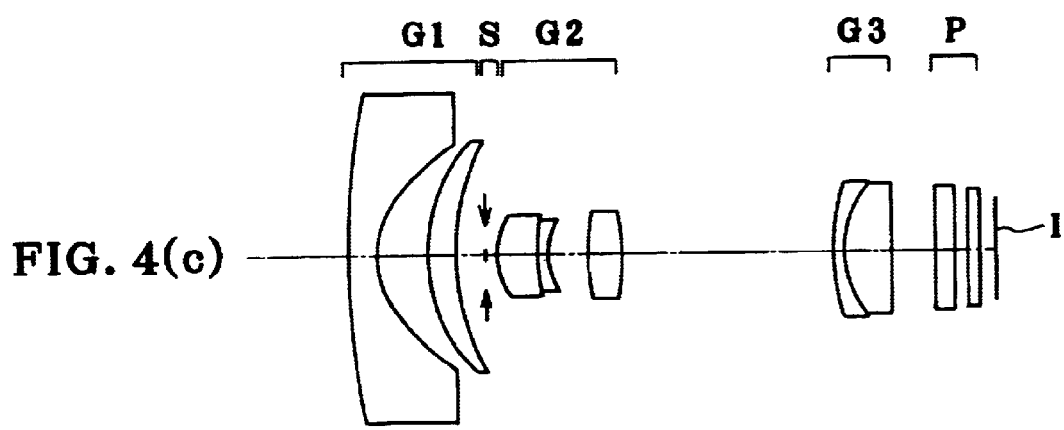

As shown in FIG. 4, the zoom lens of this example is made up of a first lens group G1 that has negative refracting power and consists of a negative meniscus lens convex on its object side and a positive meniscus lens convex on its object side, an aperture stop S, a second lens group G2 that has positive refracting power and is composed of a doublet consisting of a positive meniscus lens convex on its object side and a negative meniscus lens convex on its object side and a double-convex positive lens, and a third lens group G3 that has positive refracting power and is composed of a doublet consisting of a negative meniscus lens convex on its object side and a double-convex positive lens. Upon zooming from the wide-angle end to the telephoto end of the zoom lens, the first lens group G1 moves on a concave track toward the object side, the second lens group G2 moves together with the aperture stop S toward the object side, and the third lens group G3 moves slightly to the image plane side.

Three aspheric surfaces are used, one at the image plane side-surface of the negative meniscus lens in the firth lens group G1, one at the surface of the second lens group G2, which is located nearest to the object side of the zoom lens, and one at the surface of the second lens group G2, which is located nearest to the image plane side of the zoom lens.

EXAMPLE 5

Figure 5A:
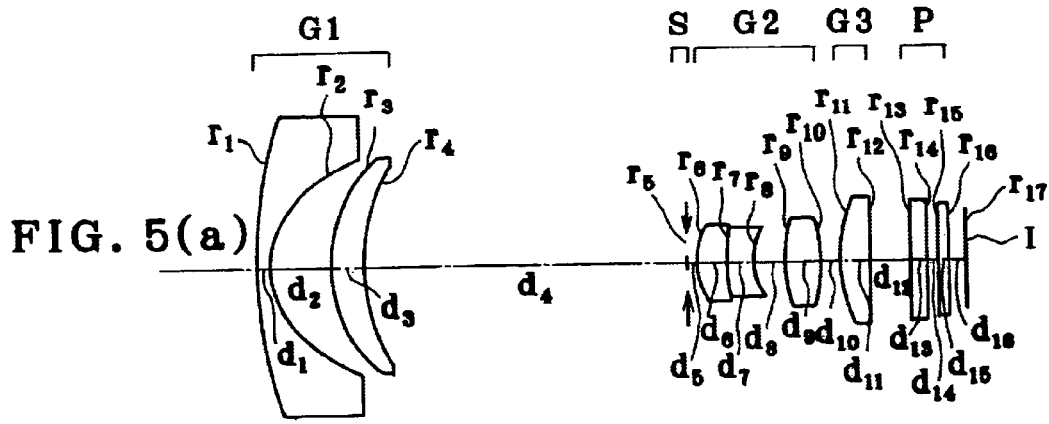
FIGS. 5(a), 5(b) and 5(c) are views, similar to FIGS. 1(a), 1(b) and 1(c), of Example 5 of the zoom lens of the present invention.
Figure 5B:
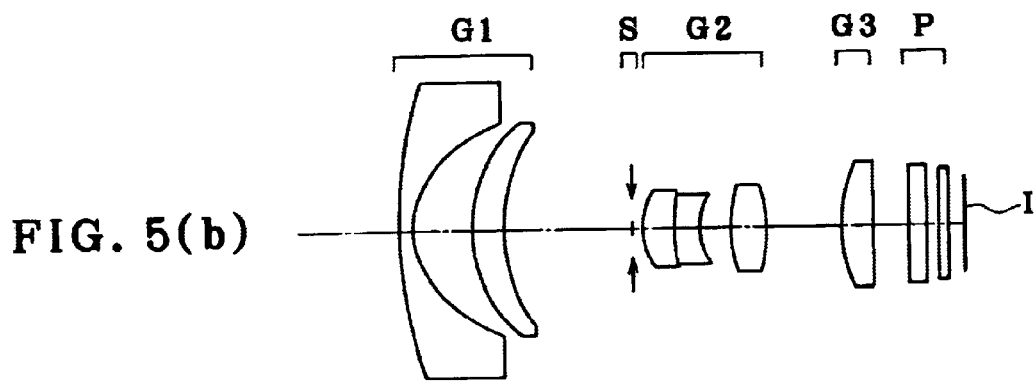
Figure 5C:
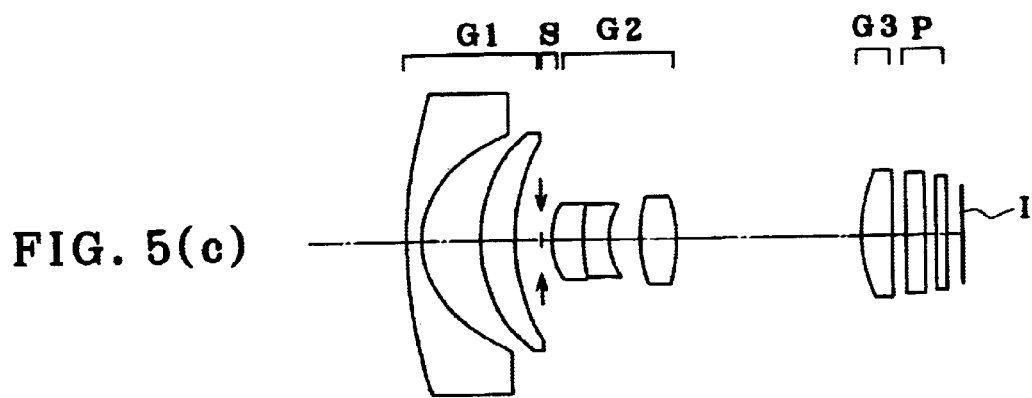

As shown in FIG. 5, the zoom lens of this example is made up of a first lens group G1 that has negative refracting power and consisting of a negative meniscus lens convex on its object side and a positive meniscus lens convex on its object side, an aperture stop S, a second lens group G2 that has positive refracting power and is composed of a doublet consisting of a positive meniscus lens convex on its object side and a negative meniscus lens convex on its object side and a double-convex positive lens, and a third lens group G3 that has positive refracting power and consisting of one double-convex position lens. Upon zooming from the wide-angle end to the telephoto end of the zoom lens, the first lens group G1 moves toward the image plane side of the zoom lens, the second lens group G2 moves together with the aperture stop S toward the object side, and the third lens group G3 moves slightly toward the image plane side.

Three aspheric surfaces are used, one at the image plane side-surface of the negative meniscus lens in the first lens group G1, one at the surface of the second lens group G2, which is located nearest to the object side of the zoom lens, and one at the surface of the second lens group G2, which is located nearest to the image plane side of the zoom lens.

EXAMPLE 6

Figure 6A:
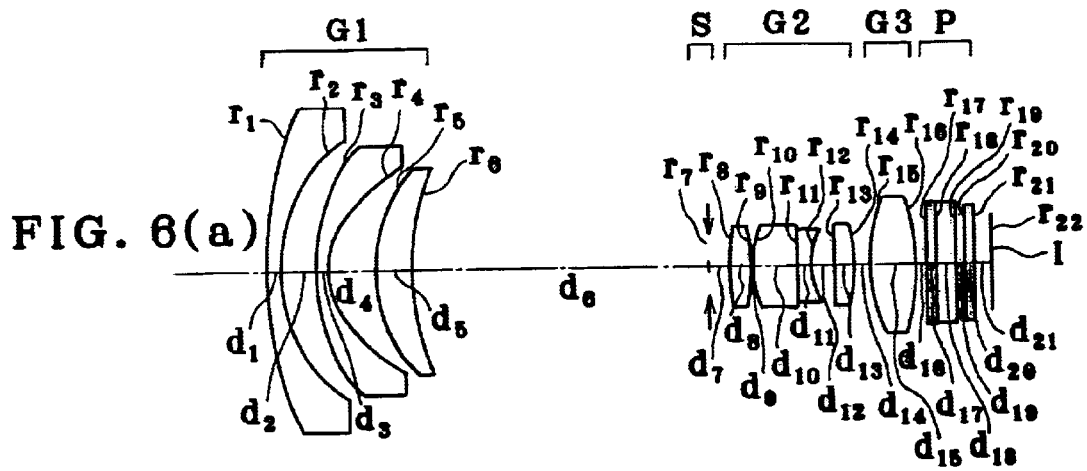
FIGS. 6(a), 6(b) and 6(c) are views, similar to FIGS. 1(a), 1(b) and 1(c), of Example 6 of the zoom lens of the present invention.
Figure 6B:
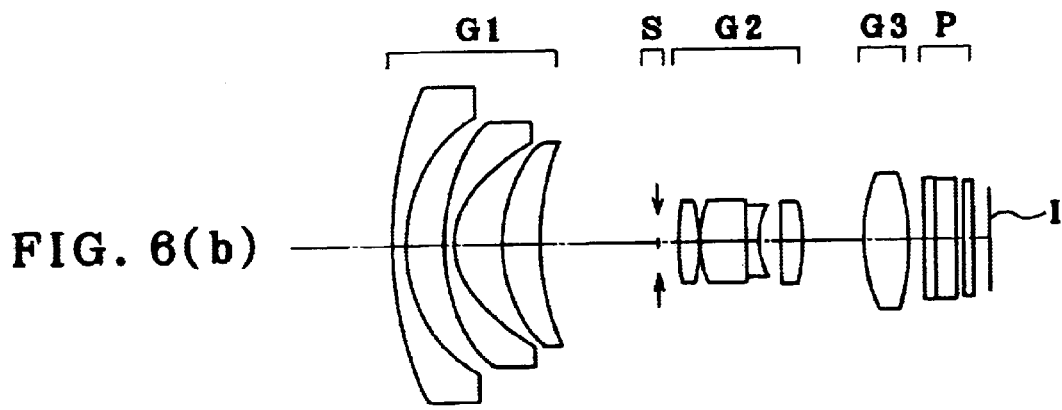
Figure 6C:
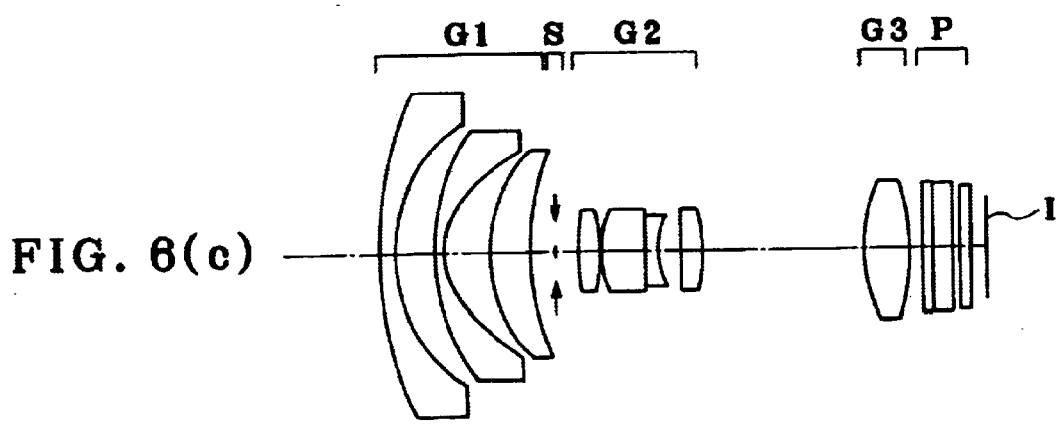

As shown in FIG. 6, the zoom lens of this example is made up of a first lens group G1 that has negative refracting power and consists of two negative meniscus lenses each convex on its object side and a positive meniscus lens convex on its object side, an aperture stop S, a second lens group G2 that has positive refracting power and is composed of a double-convex positive lens, a doublet consisting of a positive meniscus lens convex on its object side and a negative meniscus lens convex on its image plane side, and a third lens group G3 that has positive refracting power and consisting of one double-convex positive lens. Upon zooming from the wide-angle end to the telephoto end of the zoom lens, the first lens group G1 moves on a concave track toward the object side of the zoom lens, the second lens group G2 moves together with the aperture stop S toward the object side, and the third lens group G3 moves on a convex track toward the object side, arriving at the telephoto end where it is positioned slightly nearer to the object side than at the wide-angle end.

Three aspheric surfaces are used, one at the image plane side-surface of the second negative meniscus lens in the first lens group G1, one at the surface of the second lens group G2, which is positioned nearest to the object side of the zoom lens, and one at the object side-surface of the single lens in the third lens group G3.

EXAMPLE 7

Figure 7A:
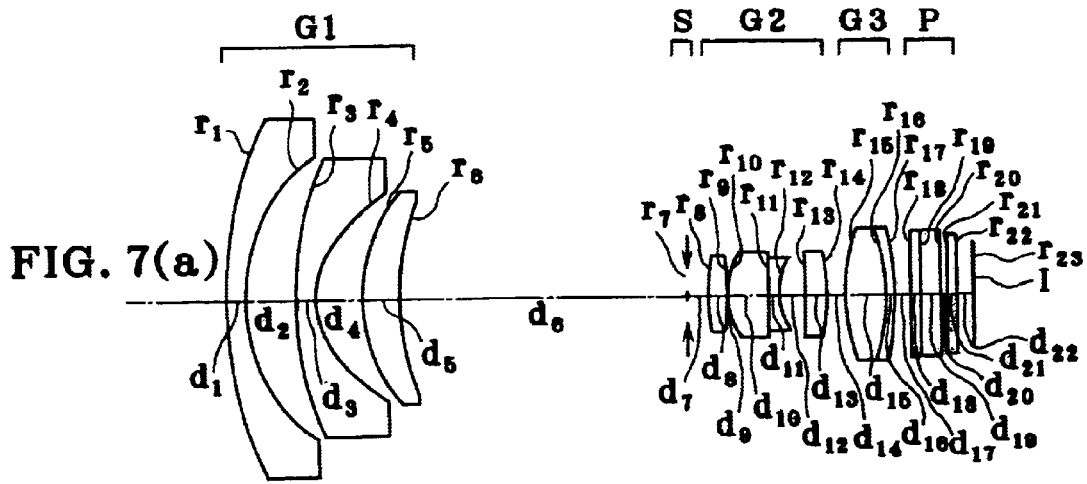
FIGS. 7(a), 7(b) and 7(c) are views, similar to FIGS. 1(a), 1(b) and 1(c), of Example 7 of the zoom lens of the present invention.
Figure 7B:
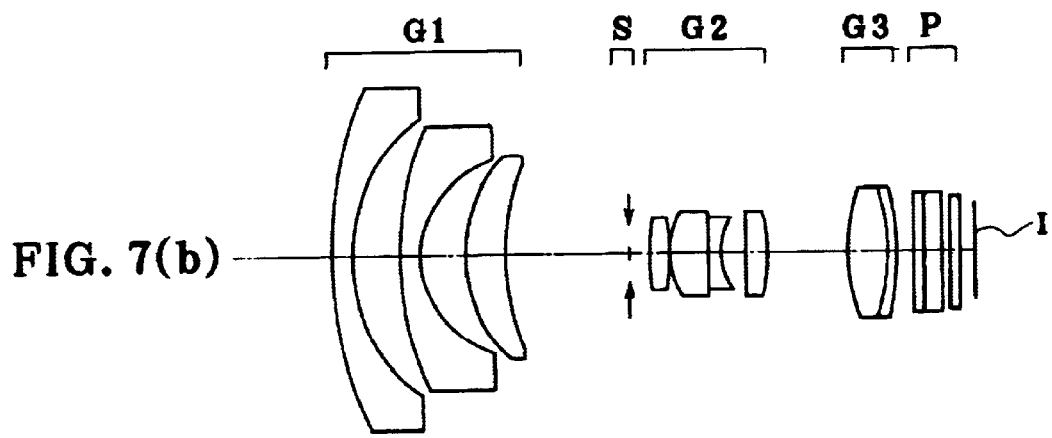
Figure 7C:
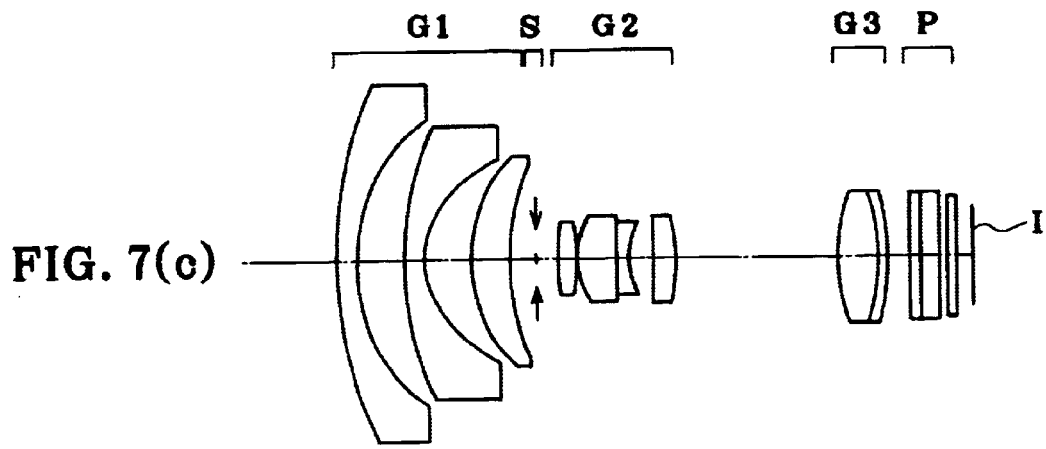

As shown in FIG. 7, the zoom lens of this example is made up of a first lens group G1 that has negative refracting power and consists of two negative meniscus lenses each convex on its object side and a positive meniscus lens convex on its object side, an aperture stop S, a second lens group that has positive refracting power and is composed of a double-convex positive lens, a doublet consisting of a positive meniscus lens convex on its object side and a negative meniscus lens convex on its object side and a positive meniscus lens convex on its image plane side, and a third lens group G3 that has positive refracting power and is composed of a doublet consisting a double-convex positive lens and a negative meniscus lens convex on its image plane side. Upon zooming from the wide-angle end to the telephoto end of the zoom lens, the first lens group G1 moves toward the image plane side of the zoom lens, the second lens group G2 moves together with the aperture stop S toward the object side of the zoom lens, and the third lens group G3 moves on a concave track toward the object side, arriving at the telephoto end where it is positioned slightly nearer to the object side than at the wide-angle end.

Two aspheric surfaces are used, one at the image plane side-surface of the second negative meniscus lens in the first lens group G1 and another at the surface of the second lens group G2, which is located nearest to the object side of the zoom lens.

EXAMPLE 8

Figure 8A:
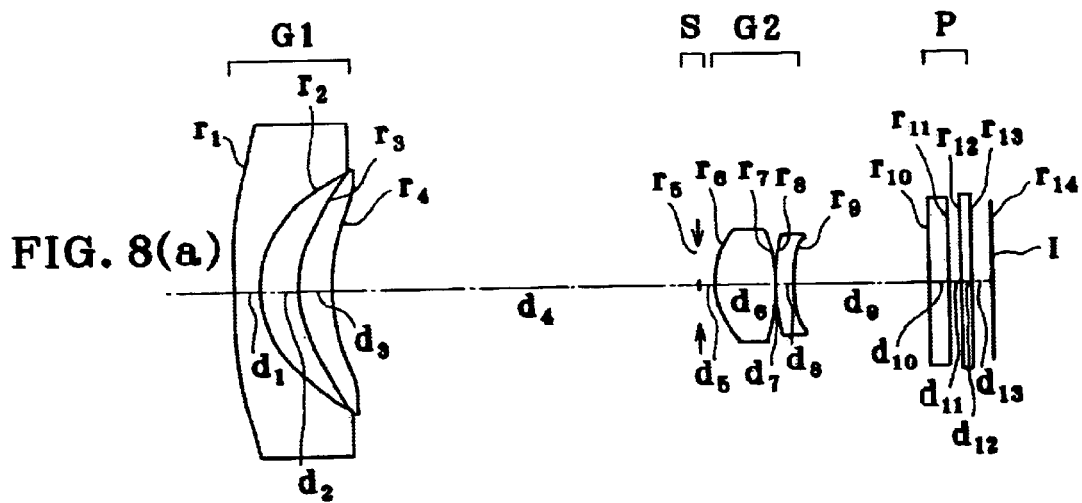
FIGS. 8(a), 8(b) and 8(c) are views, similar to FIGS. 1(a), 1(b) and 1(c), of Example 8 of the zoom lens of the present invention.
Figure 8B:
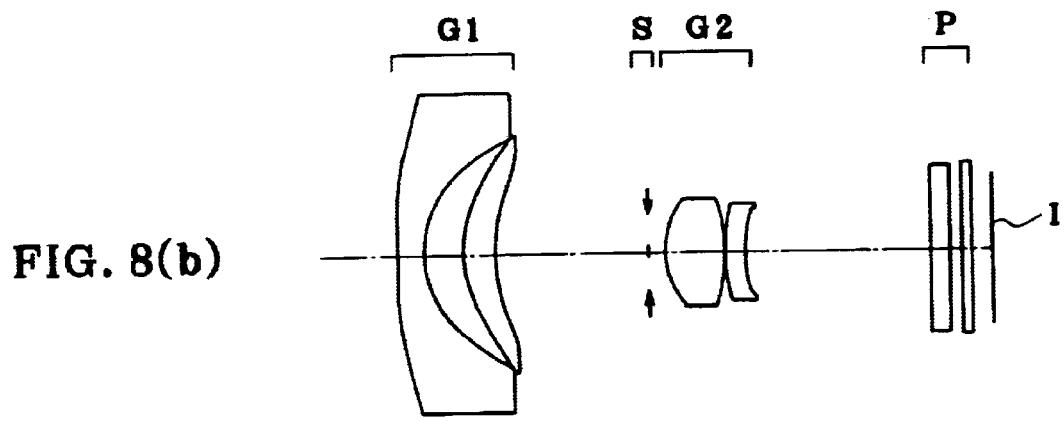
Figure 8C:
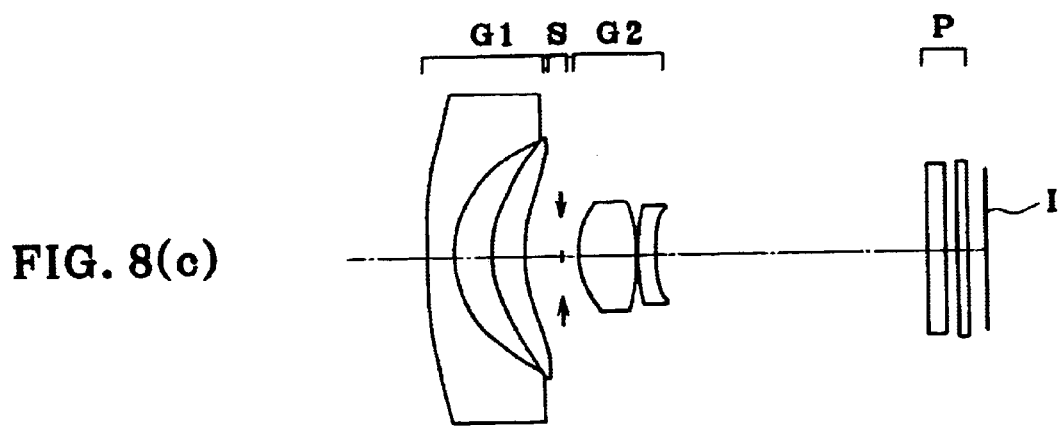
Figure 9A:
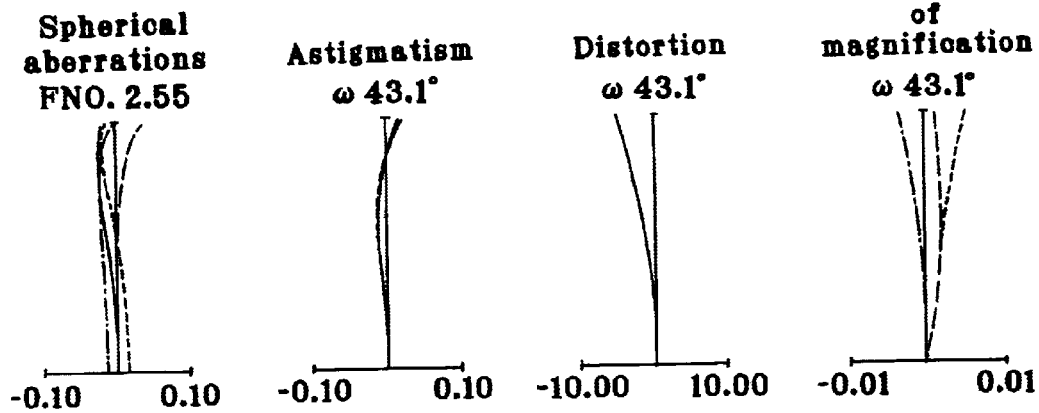
FIGS. 9(a), 9(b) and 9(c) are aberration diagrams for Example 1 upon focused on an object point at infinity.
Figure 9B:
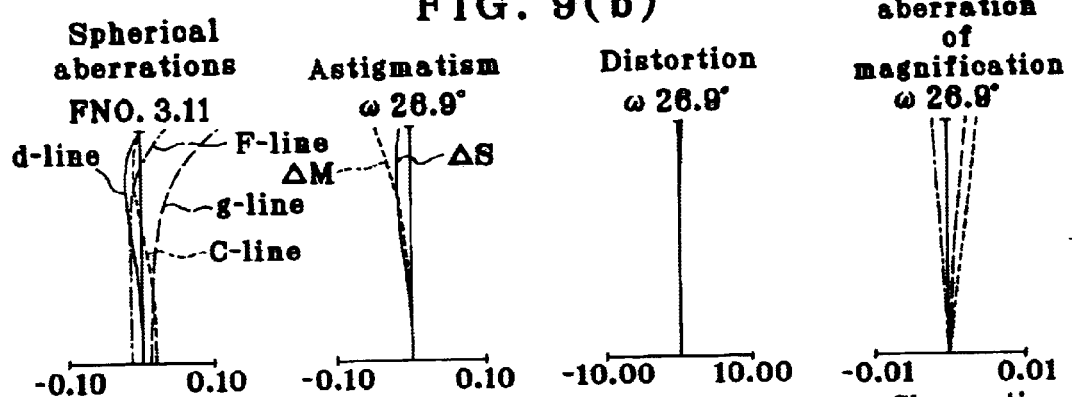
Figure 9C:
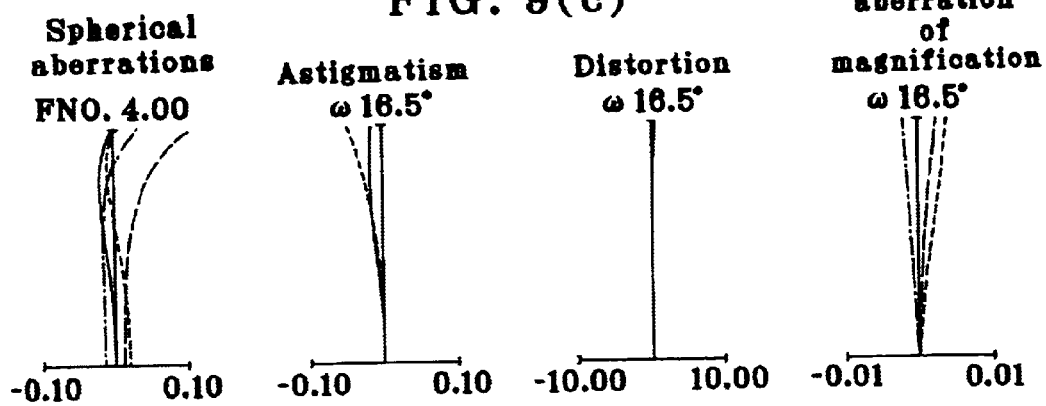
Figure 10A:
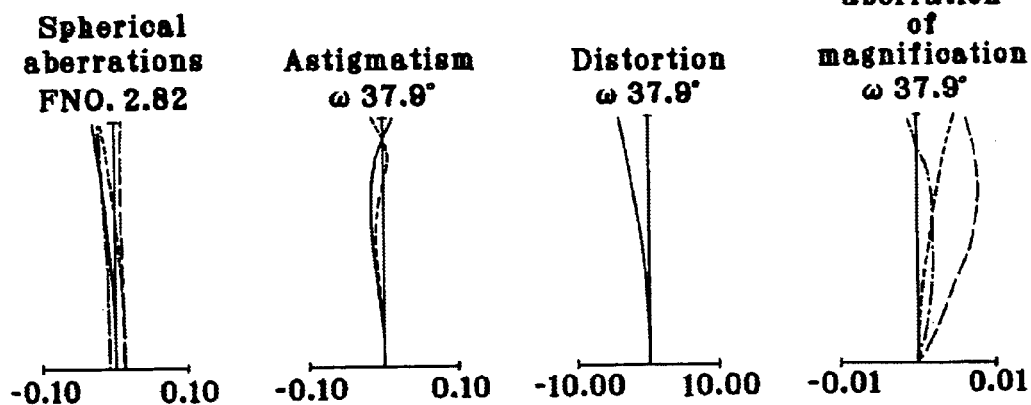
FIGS. 10(a), 10(b) and 10(c) are aberration diagrams for Example 3 upon focused on an object point at infinity.
Figure 10B:
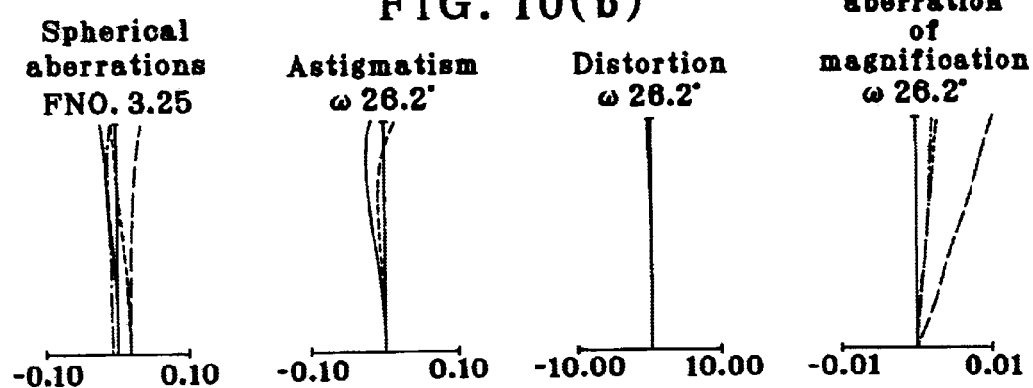
Figure 10C:
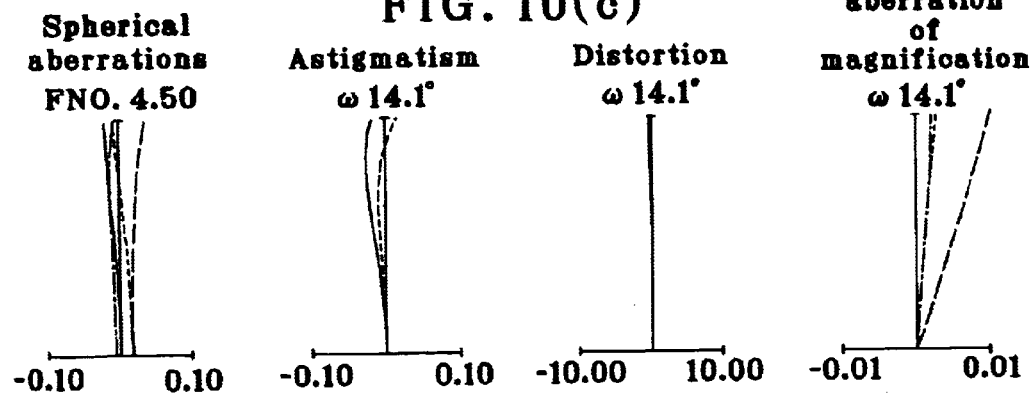
Figure 11A:
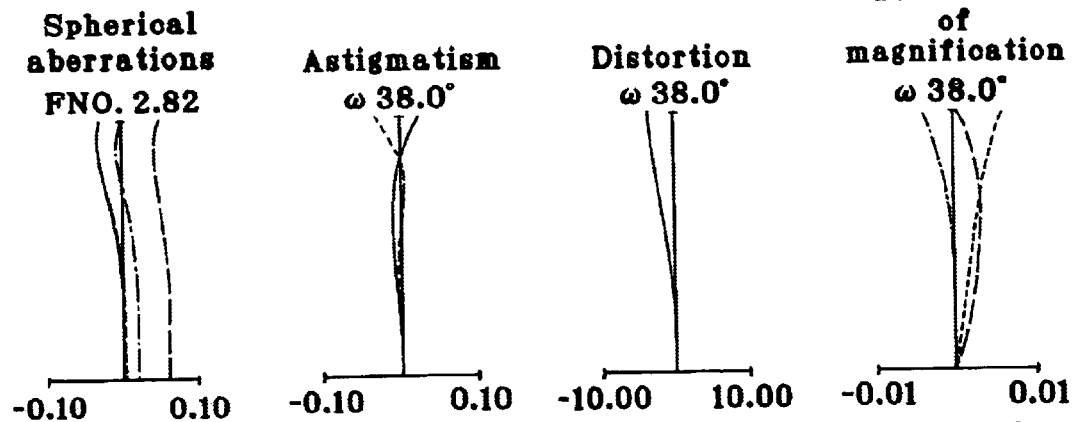
FIGS. 11(a), 11(b) and 11(c) are aberration diagrams for Example 4 upon focused on an object point at infinity.
Figure 11B:
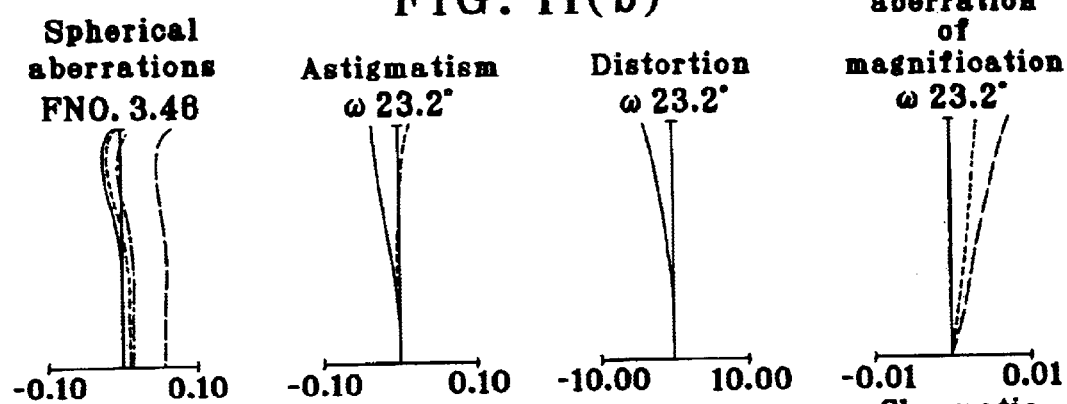
Figure 11C:
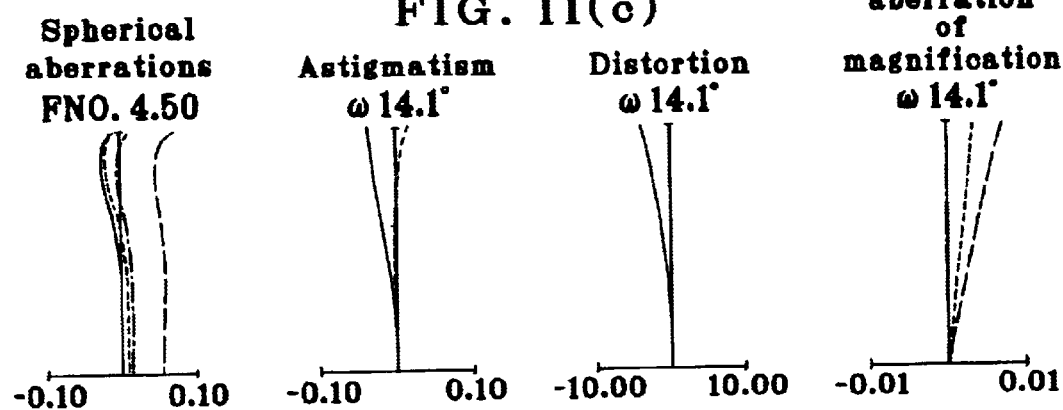
Figure 12A:
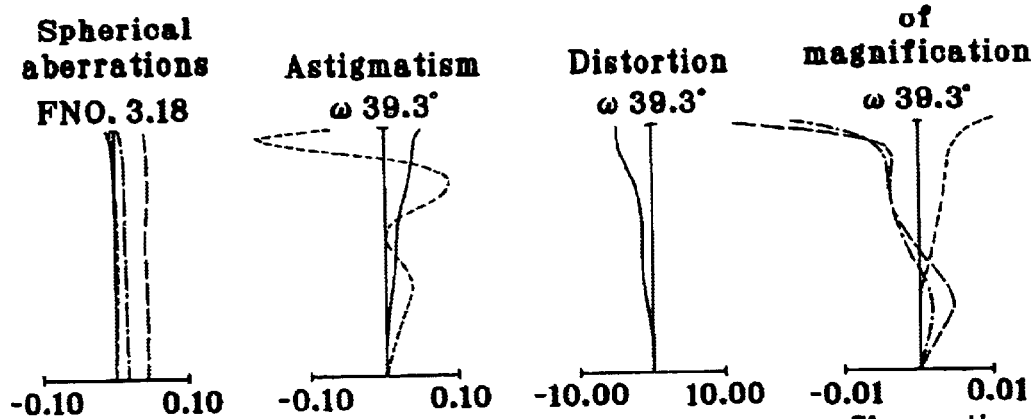
FIGS. 12(a), 12(b) and 12(c) are aberration diagrams for Example 8 upon focused on an object point at infinity.
Figure 12B:
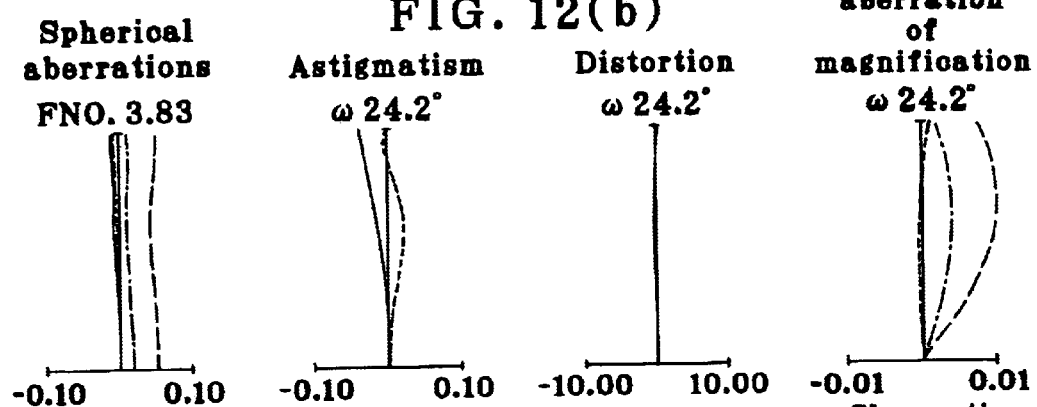
Figure 12C:
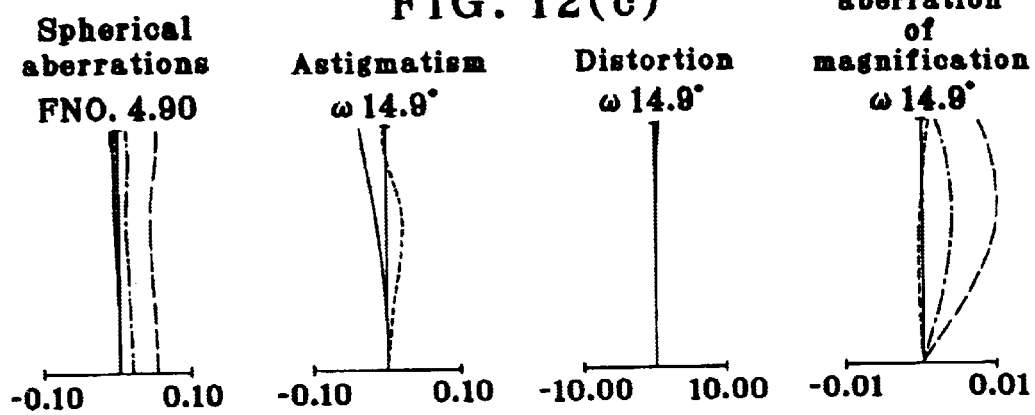

As shown in FIG. 8, the zoom lens of this example is made up of a first lens group G1 that has negative refracting power and consists of a negative meniscus lens convex on its object side and a positive meniscus lens convex on its object side, an aperture stop S, and a second lens group G2 that has positive refracting power and consists of a double-convex positive lens and a negative meniscus lens convex on its object side. Upon zooming from the wide-angle end to the telephoto end of the zoom lens, the first lens group G1 moves to the image plane side of the zoom lens, and the second lens group G2 moves together with the aperture stop S toward the object side of the zoom lens.

Eight aspheric surfaces are used at all the lens surfaces in the first lens group G1 and the second lens group G2.

Enumerated below are the numerical data on the respective examples. Symbols used hereinafter but not hereinbefore have the following meanings.

f: the focal length of the zoom lens,
$F_{NO}$: F-number,
ω: a half view angle,
WE: the wide-angle end of the zoom lens,
ST: the intermediate state of the zoom lens,
TE: the telephoto end of the zoom lens,
$r_1, r_2, \ldots$: the radius of curvature of each lens surface,
$d_1, d_2, \ldots$: the space between adjacent lens surfaces,
$n_{d1}, n_{d2}, \ldots$: the d-line refractive index of each lens, and
$\nu_{d1}, \nu_{d2}, \ldots$: the Abbe number of each lens.

Here let x be an optical axis provided that the direction of traveling of light is positive, and y be a direction perpendicular to the optical axis. Then, aspheric shape is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4, A_6, A_8$ and $A_{10}$ are the 4th, 6th, 8th and 10th-order aspheric coefficients.

EXAMPLE 1

| | | | |
|---|---|---|---|
| $r_1 = 53.863$ | $d_1 = 0.80$ | $n_{d1} = 1.58913$ | $\nu_{d1} = 61.14$ |
| $r_2 = 8.727$ | $d_2 = 3.23$ | | |
| $r_3 = 13.958$ | $d_3 = 0.80$ | $n_{d2} = 1.58913$ | $\nu_{d2} = 61.14$ |
| $r_4 = 5.417$ (Aspheric) | $d_4 = 3.50$ | | |
| $r_5 = 10.862$ | $d_5 = 2.90$ | $n_{d3} = 1.84666$ | $\nu_{d3} = 23.78$ |
| $r_6 = 16.667$ | $d_6 =$ (Variable) | | |
| $r_7 = \infty$ (Stop) | $d_7 = 1.60$ | | |
| $r_8 = 32.314$ (Aspheric) | $d_8 = 1.29$ | $n_{d4} = 1.80100$ | $\nu_{d4} = 34.97$ |
| $r_9 = -39.109$ | $d_9 = 0.10$ | | |
| $r_{10} = 6.376$ | $d_{10} = 2.11$ | $n_{d5} = 1.78590$ | $\nu_{d5} = 44.20$ |
| $r_{11} = 263.101$ | $d_{11} = 0.75$ | $n_{d6} = 1.84666$ | $\nu_{d6} = 23.78$ |
| $r_{12} = 5.345$ | $d_{12} = 1.61$ | | |
| $r_{13} = -205.936$ | $d_{13} = 1.55$ | $n_{d7} = 1.48749$ | $\nu_{d7} = 70.23$ |
| $r_{14} = -10.013$ | $d_{14} =$ (Variable) | | |
| $r_{15} = 26.276$ | $d_{15} = 1.68$ | $n_{d8} = 1.49700$ | $\nu_{d8} = 81.54$ |
| $r_{16} = 37.524$ | $d_{16} =$ (Variable) | | |
| $r_{17} = -77283.543$ (Aspheric) | $d_{17} = 2.36$ | $n_{d9} = 1.49700$ | $\nu_{d9} = 81.54$ |
| $r_{18} = -10.224$ | $d_{18} = 1.00$ | | |
| $r_{19} = \infty$ | $d_{19} = 0.80$ | $n_{d10} = 1.51633$ | $\nu_{d10} = 64.14$ |
| $r_{20} = \infty$ | $d_{20} = 1.44$ | $n_{d11} = 1.54771$ | $\nu_{d11} = 62.84$ |
| $r_{21} = \infty$ | $d_{21} = 0.50$ | | |
| $r_{22} = \infty$ | $d_{22} = 0.70$ | $n_{d12} = 1.51633$ | $\nu_{d12} = 64.14$ |
| $r_{23} = \infty$ | $d_{23} = 1.20$ | | |
| $r_{24} = \infty$ (Image Plane) | | | |

Aspherical Coefficients

4th surface $K = -0.688$
$A_4 = -1.33236 \times 10^{-4}$
$A_6 = -2.28141 \times 10^{-6}$
$A_8 = -1.99065 \times 10^{-16}$
$A_{10} = -6.74877 \times 10^{-10}$

8th surface $K = -0.001$
$A_4 = -1.19858 \times 10^{-4}$
$A_6 = -1.55060 \times 10^{-7}$
$A_8 = -1.47680 \times 10^{-7}$
$A_{10} = 1.71581 \times 10^{-9}$

17th surface $K = 0.001$
$A_4 = -6.59160 \times 10^{-4}$
$A_6 = -4.38111 \times 10^{-9}$
$A_8 = -2.00709 \times 10^{-9}$
$A_{10} = 2.22153 \times 10^{-16}$

Zooming Data (∞)

| | WE | ST | TE |
|---|---|---|---|
| f (mm) | 3.760 | 6.512 | 10.834 |
| $F_{NO}$ | 2.55 | 3.11 | 4.00 |
| ω (°) | 43.1 | 26.9 | 16.5 |
| $d_6$ | 18.80 | 7.81 | 1.80 |
| $d_{14}$ | 0.80 | 6.85 | 14.09 |
| $d_{16}$ | 2.64 | 1.20 | 0.75 |

EXAMPLE 2

| | | | |
|---|---|---|---|
| $r_1 = 45.674$ | $d_1 = 1.00$ | $n_{d1} = 1.72916$ | $\nu_{d1} = 54.68$ |
| $r_2 = 16.270$ | $d_2 = 2.23$ | | |
| $r_3 = 53.871$ | $d_3 = 1.00$ | $n_{d2} = 1.78590$ | $\nu_{d2} = 44.20$ |
| $r_4 = 6.933$ (Aspheric) | $d_4 = 2.60$ | | |
| $r_5 = 14.477$ | $d_5 = 2.49$ | $n_{d3} = 1.84666$ | $\nu_{d3} = 23.78$ |
| $r_6 = 75.130$ | $d_6 =$ (Variable) | | |
| $r_7 = \infty$ (Stop) | $d_7 = 1.50$ | | |
| $r_8 = 22.339$ (Aspheric) | $d_8 = 1.97$ | $n_{d4} = 1.80610$ | $\nu_{d4} = 40.92$ |
| $r_9 = -32.495$ | $d_9 = 0.10$ | | |
| $r_{10} = 5.780$ | $d_{10} = 2.43$ | $n_{d5} = 1.78590$ | $\nu_{d5} = 44.20$ |
| $r_{11} = 4646.777$ | $d_{11} = 0.70$ | $n_{d6} = 1.84666$ | $\nu_{d6} = 23.78$ |
| $r_{12} = 4.287$ | $d_{12} = 1.66$ | | |
| $r_{13} = -71.661$ | $d_{13} = 1.52$ | $n_{d7} = 1.48749$ | $\nu_{d7} = 70.23$ |
| $r_{14} = -16.125$ | $d_{14} =$ (Variable) | | |
| $r_{15} = 30.255$ | $d_{15} = 1.89$ | $n_{d8} = 1.48749$ | $\nu_{d8} = 70.23$ |
| $r_{16} = 224.778$ | $d_{16} =$ (Variable) | | |
| $r_{17} = -715.920$ (Aspheric) | $d_{17} = 2.46$ | $n_{d9} = 1.48749$ | $\nu_{d9} = 70.23$ |
| $r_{18} = -9.321$ | $d_{18} = 1.00$ | | |
| $r_{19} = \infty$ | $d_{19} = 0.80$ | $n_{d10} = 1.51633$ | $\nu_{d10} = 64.14$ |
| $r_{20} = \infty$ | $d_{20} = 1.44$ | $n_{d11} = 1.54771$ | $\nu_{d11} = 62.84$ |
| $r_{21} = \infty$ | $d_{21} = 0.50$ | | |
| $r_{22} = \infty$ | $d_{22} = 0.70$ | $n_{d12} = 1.51633$ | $\nu_{d12} = 64.14$ |
| $r_{23} = \infty$ | $d_{23} = 1.20$ | | |
| $r_{24} = \infty$ (Image Plane) | | | |

Aspherical Coefficients

4th surface $K = -0.230$
$A_4 = -2.48383 \times 10^{-4}$
$A_6 = -2.50032 \times 10^{-6}$
$A_8 = 1.41426 \times 10^{-13}$
$A_{10} = -9.76753 \times 10^{-10}$

8th surface $K = 0.001$
$A_4 = -6.03222 \times 10^{-5}$
$A_6 = -1.53579 \times 10^{-7}$
$A_8 = -4.56287 \times 10^{-8}$
$A_{10} = 8.02280 \times 10^{-10}$

17th surface $K = -0.001$
$A_4 = -6.18342 \times 10^{-4}$
$A_6 = 7.82501 \times 10^{-7}$
$A_8 = -5.28304 \times 10^{-9}$
$A_{10} = -5.11357 \times 10^{-16}$

Zooming Data (∞)

| | WE | ST | TE |
|---|---|---|---|
| f (mm) | 4.443 | 6.982 | 12.964 |
| $F_{NO}$ | 2.75 | 3.26 | 4.50 |
| ω (°) | 38.0 | 25.5 | 14.0 |
| $d_6$ | 20.29 | 9.89 | 1.70 |

-continued

| | | | |
|---|---|---|---|
| $d_{14}$ | 0.19 | 3.26 | 11.18 |
| $d_{16}$ | 0.96 | 1.27 | 1.60 |

EXAMPLE 3

| | | | |
|---|---|---|---|
| $r_1 = 170.130$ | $d_1 = 1.00$ | $n_{d1} = 1.72916$ | $\nu_{d1} = 54.68$ |
| $r_2 = 23.771$ | $d_2 = 1.25$ | | |
| $r_3 = 48.101$ | $d_3 = 1.00$ | $n_{d2} = 1.78590$ | $\nu_{d2} = 44.20$ |
| $r_4 = 6.850$ (Aspheric) | $d_4 = 3.00$ | | |
| $r_5 = 15.108$ | $d_5 = 2.39$ | $n_{d3} = 1.84666$ | $\nu_{d3} = 23.78$ |
| $r_6 = 75.289$ | $d_6 =$ (Variable) | | |
| $r_7 = \infty$ (Stop) | $d_7 = 1.50$ | | |
| $r_8 = 22.807$ (Aspheric) | $d_8 = 1.43$ | $n_{d4} = 1.77250$ | $\nu_{d4} = 49.60$ |
| $r_9 = -38.276$ | $d_9 = 0.10$ | | |
| $r_{10} = 6.259$ | $d_{10} = 3.21$ | $n_{d5} = 1.78590$ | $\nu_{d5} = 44.20$ |
| $r_{11} = 101748.729$ | $d_{11} = 0.70$ | $n_{d6} = 1.84666$ | $\nu_{d6} = 23.78$ |
| $r_{12} = 4.406$ | $d_{12} = 1.67$ | | |
| $r_{13} = -244.579$ | $d_{13} = 1.24$ | $n_{d7} = 1.48749$ | $\nu_{d7} = 70.23$ |
| $r_{14} = -21.974$ | $d_{14} =$ (Variable) | | |
| $r_{15} = 25.000$ | $d_{15} = 1.31$ | $n_{d8} = 1.48749$ | $\nu_{d8} = 70.23$ |
| $r_{16} = -200.000$ | $d_{16} =$ (Variable) | | |
| $r_{17} = -472.650$ (Aspheric) | $d_{17} = 2.56$ | $n_{d9} = 1.48749$ | $\nu_{d9} = 70.23$ |
| $r_{18} = -8.225$ | $d_{18} = 1.00$ | | |
| $r_{19} = \infty$ | $d_{19} = 0.80$ | $n_{d10} = 1.51633$ | $\nu_{d10} = 64.14$ |
| $r_{20} = \infty$ | $d_{20} = 1.44$ | $n_{d11} = 1.54771$ | $\nu_{d11} = 62.84$ |
| $r_{21} = \infty$ | $d_{21} = 0.50$ | | |
| $r_{22} = \infty$ | $d_{22} = 0.70$ | $n_{d12} = 1.51633$ | $\nu_{d12} = 64.14$ |
| $r_{23} = \infty$ | $d_{23} = 1.20$ | | |
| $r_{24} = \infty$ (Image Plane) | | | |

Aspherical Coefficients

4th surface $K = -0.520$
$A_4 = -1.71150 \times 10^{-4}$
$A_6 = -9.18982 \times 10^{-7}$
$A_8 = -1.90211 \times 10^{-10}$
$A_{10} = -2.10007 \times 10^{-10}$ 8th surface $K = -0.000$
$A_4 = -6.24211 \times 10^{-5}$
$A_6 = -1.75655 \times 10^{-7}$
$A_8 = -3.26422 \times 10^{-8}$
$A_{10} = 1.13753 \times 10^{-9}$ 17th surface $K = -0.000$
$A_4 = -7.31548 \times 10^{-4}$
$A_6 = 2.85030 \times 10^{-7}$
$A_8 = 2.75107 \times 10^{-13}$
$A_{10} = 2.53692 \times 10^{-16}$ Zooming Data ($\infty$)

| | WE | ST | TE |
|---|---|---|---|
| f (mm) | 4.452 | 6.795 | 12.920 |
| $F_{NO}$ | 2.82 | 3.25 | 4.50 |
| $\omega$ (°) | 37.9 | 26.2 | 14.1 |
| $d_6$ | 21.86 | 10.93 | 1.70 |
| $d_{14}$ | 1.00 | 1.28 | 5.88 |
| $d_{16}$ | 0.73 | 3.21 | 7.55 |

EXAMPLE 4

| | | | |
|---|---|---|---|
| $r_1 = 63.617$ | $d_1 = 2.12$ | $n_{d1} = 1.69350$ | $\nu_{d1} = 53.21$ |
| $r_2 = 6.538$ (Aspheric) | $d_2 = 3.55$ | | |
| $r_3 = 11.870$ | $d_3 = 2.17$ | $n_{d2} = 1.84666$ | $\nu_{d2} = 23.78$ |
| $r_4 = 19.010$ | $d_4 =$ (Variable) | | |
| $r_5 = \infty$ (Stop) | $d_5 = 0.80$ | | |
| $r_6 = 5.378$ (Aspheric) | $d_6 = 2.86$ | $n_{d3} = 1.77250$ | $\nu_{d3} = 49.60$ |
| $r_7 = 11.272$ | $d_7 = 0.69$ | $n_{d4} = 1.84666$ | $\nu_{d4} = 23.78$ |
| $r_8 = 4.648$ | $d_8 = 2.91$ | | |
| $r_9 = 13.776$ | $d_9 = 2.24$ | $n_{d5} = 1.58913$ | $\nu_{d5} = 61.14$ |
| $r_{10} = -20.661$ (Aspheric) | $d_{10} =$ (Variable) | | |
| $r_{11} = 14.943$ | $d_{11} = 0.80$ | $n_{d6} = 1.84666$ | $\nu_{d6} = 23.78$ |
| $r_{12} = 7.838$ | $d_{12} = 3.29$ | $n_{d7} = 1.77250$ | $\nu_{d7} = 49.60$ |
| $r_{13} = -8009.973$ | $d_{13} =$ (Variable) | | |
| $r_{14} = \infty$ | $d_{14} = 1.44$ | $n_{d8} = 1.54771$ | $\nu_{d8} = 62.84$ |
| $r_{15} = \infty$ | $d_{15} = 0.80$ | | |
| $r_{16} = \infty$ | $d_{16} = 0.80$ | $n_{d9} = 1.51633$ | $\nu_{d9} = 64.14$ |
| $r_{17} = \infty$ | $d_{17} = 1.20$ | | |
| $r_{18} = \infty$ (Image Plane) | | | |

Aspherical Coefficients

2nd surface $K = -0.664$
$A_4 = -1.46542 \times 10^{-11}$
$A_6 = 8.11091 \times 10^{-10}$
$A_8 = -4.88691 \times 10^{-12}$
$A_{10} = -4.13146 \times 10^{-11}$ 6th surface $K = -0.006$
$A_4 = -2.90892 \times 10^{-4}$
$A_6 = 1.51972 \times 10^{-6}$
$A_8 = -1.20416 \times 10^{-6}$
$A_{10} = 3.30172 \times 10^{-9}$ 10th surface $K = -4.430$
$A_4 = 7.07242 \times 10^{-13}$
$A_6 = -3.27642 \times 10^{-11}$
$A_8 = -1.02075 \times 10^{-10}$
$A_{10} = 9.05277 \times 10^{-15}$ Zooming Data ($\infty$)

| | WE | ST | TE |
|---|---|---|---|
| f (mm) | 4.414 | 8.084 | 13.501 |
| $F_{NO}$ | 2.82 | 3.46 | 4.50 |
| $\omega$ (°) | 38.0 | 23.2 | 14.1 |
| $d_4$ | 24.68 | 8.98 | 2.00 |
| $d_{10}$ | 0.18 | 5.91 | 15.38 |
| $d_{13}$ | 3.35 | 3.45 | 3.00 |

EXAMPLE 5

| | | | |
|---|---|---|---|
| $r_1 = 36.437$ | $d_1 = 0.90$ | $n_{d1} = 1.69350$ | $\nu_{d1} = 53.21$ |
| $r_2 = 6.102$ (Aspheric) | $d_2 = 4.45$ | | |
| $r_3 = 10.424$ | $d_3 = 2.50$ | $n_{d2} = 1.84666$ | $\nu_{d2} = 23.78$ |
| $r_4 = 14.410$ | $d_4 =$ (Variable) | | |
| $r_5 = \infty$ (Stop) | $d_5 = 0.80$ | | |
| $r_6 = 5.672$ (Aspheric) | $d_6 = 2.38$ | $n_{d3} = 1.77250$ | $\nu_{d3} = 49.60$ |
| $r_7 = 14.357$ | $d_7 = 1.96$ | $n_{d4} = 1.84666$ | $\nu_{d4} = 23.78$ |
| $r_8 = 4.570$ | $d_8 = 2.33$ | | |
| $r_9 = 9.382$ | $d_9 = 2.78$ | $n_{d5} = 1.49700$ | $\nu_{d5} = 81.54$ |
| $r_{10} = -12.963$ (Aspheric) | $d_{10} =$ (Variable) | | |
| $r_{11} = 12.128$ | $d_{11} = 2.30$ | $n_{d6} = 1.49700$ | $\nu_{d6} = 81.54$ |
| $r_{12} = -293675319.751$ | $d_{12} =$ (Variable) | | |
| $r_{13} = \infty$ | $d_{13} = 1.44$ | $n_{d7} = 1.54771$ | $\nu_{d7} = 62.84$ |
| $r_{14} = \infty$ | $d_{14} = 0.80$ | | |

-continued

| | | | |
|---|---|---|---|
| $r_{15} = \infty$ | $d_{15} = 0.80$ | $n_{d8} = 1.51633$ | $\nu_{d8} = 64.14$ |
| $r_{16} = \infty$ | $d_{16} = 1.20$ | | |
| $r_{17} = \infty$ (Image Plane) | | | |

Aspherical Coefficients

2nd surface

K = −0.590
$A_4 = -1.00944 \times 10^{-5}$
$A_6 = 1.47776 \times 10^{-9}$
$A_8 = 1.53887 \times 10^{-8}$
$A_{10} = -1.91708 \times 10^{-10}$ 6th surface K = 0.000
$A_4 = -2.83702 \times 10^{-4}$
$A_6 = 3.75075 \times 10^{-7}$
$A_8 = -9.53163 \times 10^{-7}$
$A_{10} = 3.40481 \times 10^{-9}$ 10th surface K = −2.651
$A_4 = 5.36943 \times 10^{-9}$
$A_6 = -1.97440 \times 10^{-11}$
$A_8 = -1.52527 \times 10^{-9}$
$A_{10} = -1.68233 \times 10^{-15}$ Zooming Data (∞)

| | WE | ST | TE |
|---|---|---|---|
| f (mm) | 4.401 | 7.500 | 12.800 |
| $F_{NO}$ | 2.92 | 3.44 | 4.50 |
| ω (°) | 38.2 | 24.7 | 14.8 |
| $d_4$ | 24.30 | 9.63 | 2.00 |
| $d_{10}$ | 1.50 | 5.76 | 14.17 |
| $d_{12}$ | 2.91 | 2.69 | 1.00 |

EXAMPLE 6

| | | | |
|---|---|---|---|
| $r_1 = 32.911$ | $d_1 = 0.80$ | $n_{d1} = 1.62299$ | $\nu_{d1} = 58.16$ |
| $r_2 = 11.068$ | $d_2 = 2.78$ | | |
| $r_3 = 15.252$ | $d_3 = 0.80$ | $n_{d2} = 1.77250$ | $\nu_{d2} = 49.60$ |
| $r_4 = 5.879$ (Aspheric) | $d_4 = 3.27$ | | |
| $r_5 = 10.978$ | $d_5 = 2.82$ | $n_{d3} = 1.84666$ | $\nu_{d3} = 23.78$ |
| $r_6 = 19.975$ | $d_6 =$ (Variable) | | |
| $r_7 = \infty$ (Stop) | $d_7 = 1.60$ | | |
| $r_8 = 29.758$ (Aspheric) | $d_8 = 1.31$ | $n_{d4} = 1.77250$ | $\nu_{d4} = 49.60$ |
| $r_9 = -32.015$ | $d_9 = 0.10$ | | |
| $r_{10} = 6.838$ | $d_{10} = 3.45$ | $n_{d5} = 1.78590$ | $\nu_{d5} = 44.20$ |
| $r_{11} = 1130.844$ | $d_{11} = 0.75$ | $n_{d6} = 1.84666$ | $\nu_{d6} = 23.78$ |
| $r_{12} = 4.987$ | $d_{12} = 1.72$ | | |
| $r_{13} = -345.379$ | $d_{13} = 1.59$ | $n_{d7} = 1.48749$ | $\nu_{d7} = 70.23$ |
| $r_{14} = -11.493$ | $d_{14} =$ (Variable) | | |
| $r_{15} = 12.194$ (Aspheric) | $d_{15} = 3.27$ | $n_{d8} = 1.49700$ | $\nu_{d8} = 81.54$ |
| $r_{16} = -18.566$ | $d_{16} =$ (Variable) | | |
| $r_{17} = \infty$ | $d_{17} = 0.80$ | $n_{d9} = 1.51633$ | $\nu_{d9} = 64.14$ |
| $r_{18} = \infty$ | $d_{18} = 1.44$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.70$ | $n_{d11} = 1.51633$ | $\nu_{d11} = 64.14$ |
| $r_{21} = \infty$ | $d_{21} = 1.20$ | | |
| $r_{22} = \infty$ (Image Plane) | | | |

Aspherical Coefficients

4th surface

K = −0.617
$A_4 = -1.93253 \times 10^{-5}$
$A_6 = -2.75457 \times 10^{-7}$
$A_8 = -6.46843 \times 10^{-10}$
$A_{10} = -3.95500 \times 10^{-10}$ 8th surface K = −0.087
$A_4 = -8.72704 \times 10^{-5}$
$A_6 = 8.82630 \times 10^{-7}$
$A_8 = -2.16086 \times 10^{-7}$
$A_{10} = 2.03920 \times 10^{-9}$ 15th surface K = 0.548
$A_4 = -1.59439 \times 10^{-4}$
$A_6 = -1.63544 \times 10^{-7}$
$A_8 = -9.44027 \times 10^{-9}$
$A_{10} = -9.77603 \times 10^{-16}$ Zooming Data (∞)

| | WE | ST | TE |
|---|---|---|---|
| f (mm) | 3.760 | 6.397 | 10.853 |
| $F_{NO}$ | 2.89 | 3.41 | 4.50 |
| ω (°) | 42.3 | 27.9 | 17.1 |
| $d_6$ | 21.11 | 8.25 | 1.80 |
| $d_{14}$ | 1.00 | 4.21 | 11.45 |
| $d_{16}$ | 0.78 | 1.23 | 1.00 |

EXAMPLE 7

| | | | |
|---|---|---|---|
| $r_1 = 30.082$ | $d_1 = 1.40$ | $n_{d1} = 1.58913$ | $\nu_{d1} = 61.14$ |
| $r_2 = 12.719$ | $d_2 = 3.66$ | | |
| $r_3 = 24.428$ | $d_3 = 1.50$ | $n_{d2} = 1.69350$ | $\nu_{d2} = 53.21$ |
| $r_4 = 5.930$ (Aspheric) | $d_4 = 3.42$ | | |
| $r_5 = 11.043$ | $d_5 = 2.93$ | $n_{d3} = 1.84666$ | $\nu_{d3} = 23.78$ |
| $r_6 = 18.335$ | $d_6 =$ (Variable) | | |
| $r_7 = \infty$ (Stop) | $d_7 = 1.60$ | | |
| $r_8 = 31.458$ (Aspheric) | $d_8 = 1.31$ | $n_{d4} = 1.77250$ | $\nu_{d4} = 49.60$ |
| $r_9 = -40.051$ | $d_9 = 0.10$ | | |
| $r_{10} = 6.689$ | $d_{10} = 3.00$ | $n_{d5} = 1.79952$ | $\nu_{d5} = 42.22$ |
| $r_{11} = 1112.110$ | $d_{11} = 0.75$ | $n_{d6} = 1.84666$ | $\nu_{d6} = 23.78$ |
| $r_{12} = 5.112$ | $d_{12} = 1.98$ | | |
| $r_{13} = -105.042$ | $d_{13} = 1.71$ | $n_{d7} = 1.69680$ | $\nu_{d7} = 55.53$ |
| $r_{14} = -13.133$ | $d_{14} =$ (Variable) | | |
| $r_{15} = 12.617$ | $d_{15} = 3.04$ | $n_{d8} = 1.51633$ | $\nu_{d8} = 64.14$ |
| $r_{16} = -15.100$ | $d_{16} = 0.80$ | $n_{d9} = 1.78472$ | $\nu_{d9} = 25.68$ |
| $r_{17} = -24.333$ | $d_{17} =$ (Variable) | | |
| $r_{18} = \infty$ | $d_{18} = 0.80$ | $n_{d10} = 1.51633$ | $\nu_{d10} = 64.14$ |
| $r_{19} = \infty$ | $d_{19} = 1.44$ | $n_{d11} = 1.54771$ | $\nu_{d11} = 62.84$ |
| $r_{20} = \infty$ | $d_{20} = 0.50$ | | |
| $r_{21} = \infty$ | $d_{21} = 0.70$ | $n_{d12} = 1.51633$ | $\nu_{d12} = 64.14$ |
| $r_{22} = \infty$ | $d_{22} = 1.20$ | | |
| $r_{23} = \infty$ (Image Plane) | | | |

Aspherical Coefficients

4th surface

K = −0.662
$A_4 = 3.24127 \times 10^{-6}$
$A_6 = -1.03867 \times 10^{-9}$
$A_8 = 1.21579 \times 10^{-9}$
$A_{10} = -2.40782 \times 10^{-10}$ 8th surface K = −0.798
$A_4 = -9.62860 \times 10^{-5}$
$A_6 = 1.42380 \times 10^{-6}$ -continued $A_8 = -2.20150 \times 10^{-7}$
$A_{10} = 2.08820 \times 10^{-9}$ Zooming Data (∞)

|  | WE | ST | TE |
|---|---|---|---|
| f (mm) | 3.774 | 6.546 | 10.881 |
| $F_{NO}$ | 2.97 | 3.62 | 4.50 |
| ω (°) | 42.9 | 27.6 | 17.3 |
| $d_6$ | 21.54 | 9.26 | 1.90 |
| $d_{14}$ | 1.20 | 5.77 | 11.87 |
| $d_{17}$ | 1.20 | 1.10 | 1.70 |

EXAMPLE 8

| $r_1 = -728766774.650$ (Aspheric) | $d_1 = 1.20$ | $n_{d1} = 1.79952$ | $v_{d1} = 42.22$ |
|---|---|---|---|
| $r_2 = 5.056$ (Aspheric) | $d_2 = 1.98$ | | |
| $r_3 = 5.667$ (Aspheric) | $d_3 = 1.70$ | $n_{d2} = 1.82114$ | $v_{d2} = 24.06$ |
| $r_4 = 9.397$ (Aspheric) | $d_4 =$ (Variable) | | |
| $r_5 = \infty$ (Stop) | $d_5 = 0.80$ | | |
| $r_6 = 3.929$ (Aspheric) | $d_6 = 2.93$ | $n_{d3} = 1.49700$ | $v_{d3} = 81.54$ |
| $r_7 = -9.956$ (Aspheric) | $d_7 = 0.10$ | | |
| $r_8 = 405054.351$ (Aspheric) | $d_8 = 0.80$ | $n_{d4} = 1.82114$ | $v_{d4} = 24.06$ |
| $r_9 = 9.890$ (Aspheric) | $d_9 =$ (Variable) | | |
| $r_{10} = \infty$ | $d_{10} = 0.96$ | $n_{d5} = 1.54771$ | $v_{d5} = 62.84$ |
| $r_{11} = \infty$ | $d_{11} = 0.60$ | | |
| $r_{12} = \infty$ | $d_{12} = 0.50$ | $n_{d6} = 1.51633$ | $v_{d6} = 64.14$ |
| $r_{13} = \infty$ | $d_{13} = 0.99$ | | |
| $r_{14} = \infty$ (Image Plane) | | | |

Aspherical Coefficients

1st surface $K = 1.000$
$A_4 = 9.94300 \times 10^{-4}$
$A_6 = -1.78716 \times 10^{-5}$
$A_8 = 1.02248 \times 10^{-7}$
$A_{10} = 9.42736 \times 10^{-14}$ 2nd surface $K = -0.354$
$A_4 = -1.03647 \times 10^{-9}$
$A_6 = 4.10242 \times 10^{-5}$
$A_8 = -1.41162 \times 10^{-6}$
$A_{10} = 8.30750 \times 10^{-14}$ 3rd surface $K = -1.944$
$A_4 = 2.28074 \times 10^{-5}$
$A_6 = 2.40815 \times 10^{-11}$
$A_8 = 3.19088 \times 10^{-10}$
$A_{10} = -1.99260 \times 10^{-12}$ 4th surface $K = -0.002$
$A_4 = -5.04587 \times 10^{-4}$
$A_6 = -8.52842 \times 10^{-6}$
$A_8 = -6.20027 \times 10^{-12}$
$A_{10} = -8.50488 \times 10^{-13}$ 6th surface $K = -0.816$
$A_4 = 2.77495 \times 10^{-8}$
$A_6 = 1.01467 \times 10^{-7}$
$A_8 = -1.01668 \times 10^{-5}$
$A_{10} = 5.38886 \times 10^{-8}$ 7th surface $K = 0.001$
$A_4 = 2.30715 \times 10^{-3}$ -continued $A_6 = -7.18727 \times 10^{-4}$
$A_8 = 6.62890 \times 10^{-5}$
$A_{10} = -2.13592 \times 10^{-6}$ 8th surface $K = -9001285239.731$
$A_4 = 8.43472 \times 10^{-3}$
$A_6 = -8.10855 \times 10^{-4}$
$A_8 = 5.82965 \times 10^{-5}$
$A_{10} = -8.91948 \times 10^{-7}$ 9th surface $K = -0.031$
$A_4 = 1.02466 \times 10^{-2}$
$A_6 = -2.25829 \times 10^{-8}$
$A_8 = 3.60456 \times 10^{-9}$
$A_{10} = 5.29958 \times 10^{-6}$ Zooming Data (∞)

|  | WE | ST | TE |
|---|---|---|---|
| f (mm) | 4.602 | 8.000 | 13.499 |
| $F_{NO}$ | 3.18 | 3.83 | 4.90 |
| ω (°) | 39.3 | 24.2 | 14.9 |
| $d_4$ | 18.24 | 7.64 | 1.80 |
| $d_9$ | 6.93 | 9.42 | 13.50 |

Aberration diagrams for Examples 1, 3, 4 and 8 upon focused on an object point at infinity are shown in FIGS. 9 to 12, wherein (a) is an aberration diagram at the wide-angle end, (b) in the intermediate state, and (c) at the telephoto end.

Set out below are the values of conditions (1) to (4), conditions (6) to (10) and conditions (A) and (B).

| | Ex. | | | | | | | |
|---|---|---|---|---|---|---|---|---|
| | 1 | 2 | 3 | 4 | 5 | 6 | 7 | 8 |
| (1) | 0.51 | 0.39 | 0.41 | 0.60 | 0.66 | 0.60 | 0.60 | 0.63 |
| (2) | 0.82 | 0.88 | 0.86 | 0.82 | 0.82 | 0.82 | 0.82 | 0.92 |
| (3) | 1.01 | 1.29 | 1.23 | 0.93 | 0.89 | 0.93 | 0.93 | 1.02 |
| (4) | 1.38 | 1.24 | 1.27 | 1.33 | 1.31 | 1.34 | 1.34 | 1.18 |
| (6) | 0.84 | 0.74 | 0.70 | 0.86 | 0.81 | 0.73 | 0.76 | — |
| (7) | 0.014 | 0.001 | 0.000 | 0.392 | 0.307 | 0.003 | 0.003 | — |
| (8) | 3.37 | 2.94 | 3.17 | 3.55 | 3.22 | 3.41 | 3.49 | 1.99 |
| (9) | 3.33 | 4.45 | 4.61 | 5.16 | 5.00 | 4.14 | 3.96 | 3.77 |
| (10) | 0.99 | 1.14 | 1.11 | 1.04 | 1.14 | 0.91 | 0.93 | 1.14 |
| (A) | 2.27 | 1.30 | 1.33 | 1.23 | 1.40 | 2.25 | 1.64 | 1.00 |
| (B) | 2.58 | 7.77 | 7.02 | 9.73 | 5.97 | 2.59 | 4.12 | −∞ |

Figure 13:
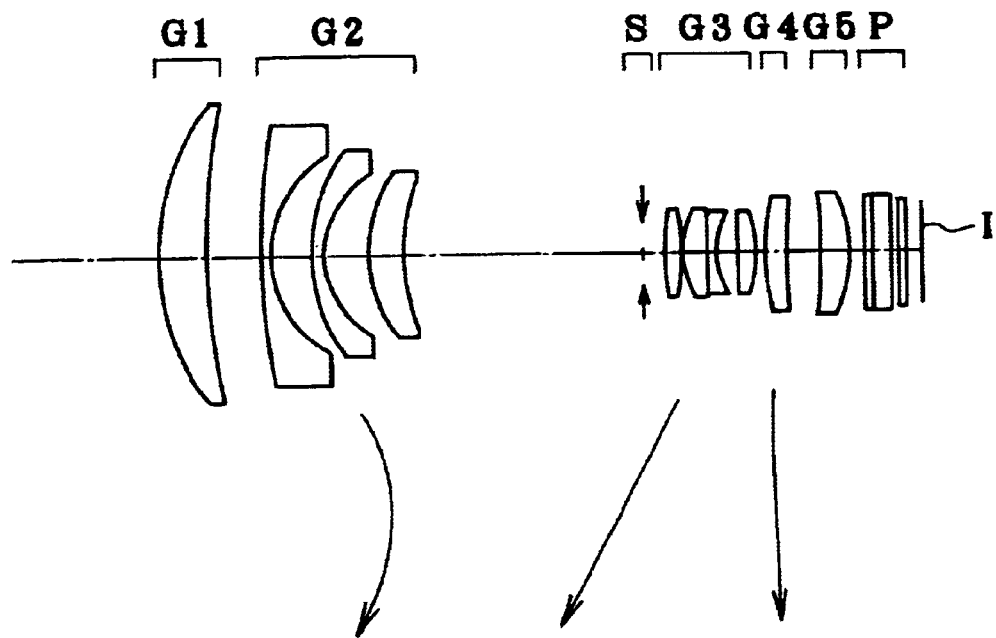
FIG. 13 is illustrative in schematic section of another embodiment of the zoom lens according to the present invention.
Figure 14:
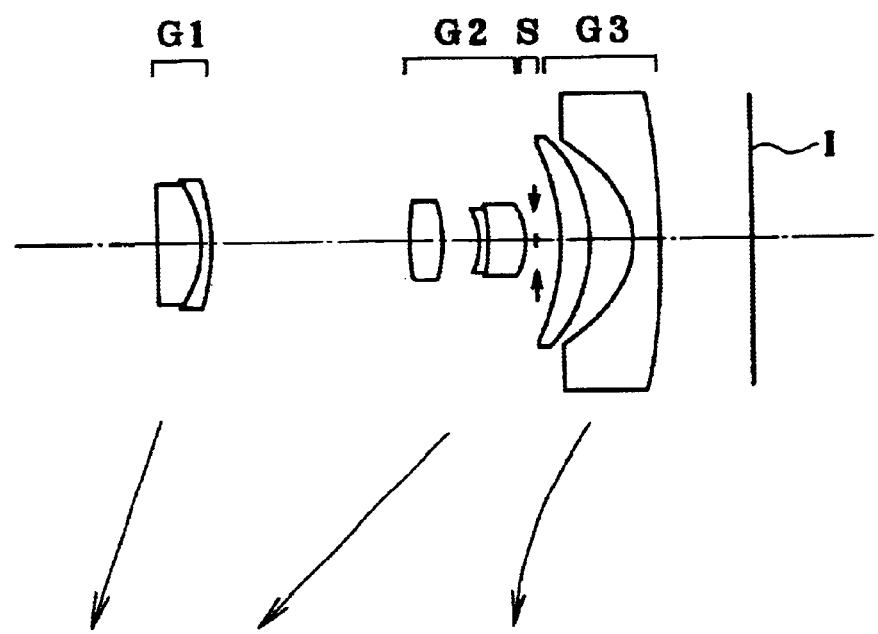
FIG. 14 is illustrative in schematic section of yet another embodiment of the zoom lens according to the present invention.

The present invention may be applicable not only to the zoom lens types exemplified in the aforesaid examples but also to a variety of other zoom lens types. As schematically shown in section in FIG. 13, for instance, a five-group zoom lens of the +−+++ type may be designed by adding a positive lens component having weak power to the object side of Example 1 to form a first lens group G1, and constructing as the subsequent lens groups, a second lens group G2 of negative power, a third lens group G3 of positive power, a fourth lens group G4 of positive power and a fifth lens group G5 of positive power with an aperture stop S interposed between the second and third lens groups G2 and G3. As schematically shown in section in FIG. 14, a three-group zoom lens for silver-halide cameras wherein a silver-halide photographic film is set on an image plane I of the ++− type may be constructed by reversing the object and image sides of Example 4.

The image pickup system of the present invention may be used with phototaking systems wherein an object image formed by a zoom lens is received at an electronic image pickup device such as a CCD, especially with digital cameras or video cameras, information processors represented by personal computers, and personal digital assistants such as telephones, especially convenient-to-carry cellular phones.

Figure 15:
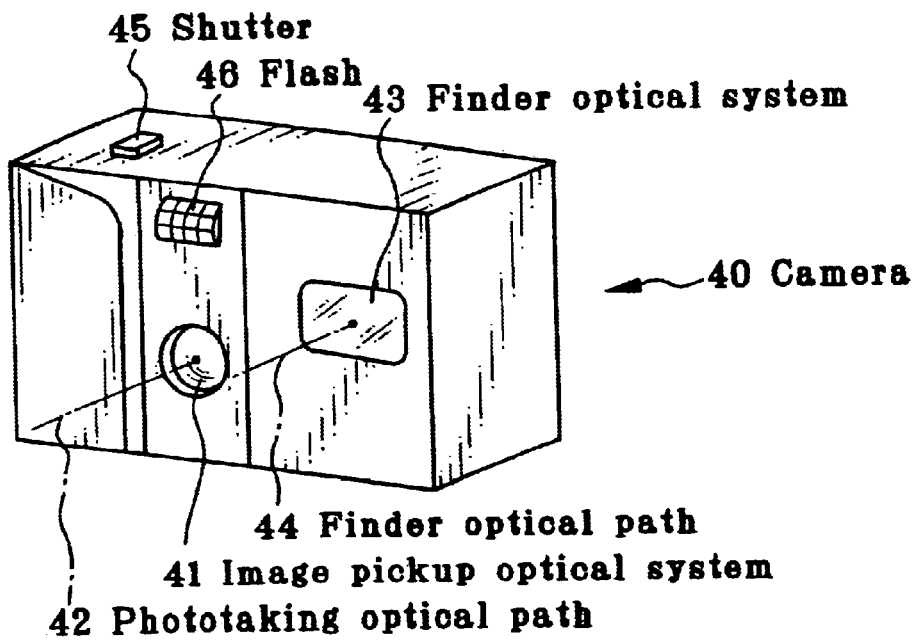
FIG. 15 is a front perspective view of the outward appearance of a digital camera with the zoom lens of the invention built therein.
Figure 16:
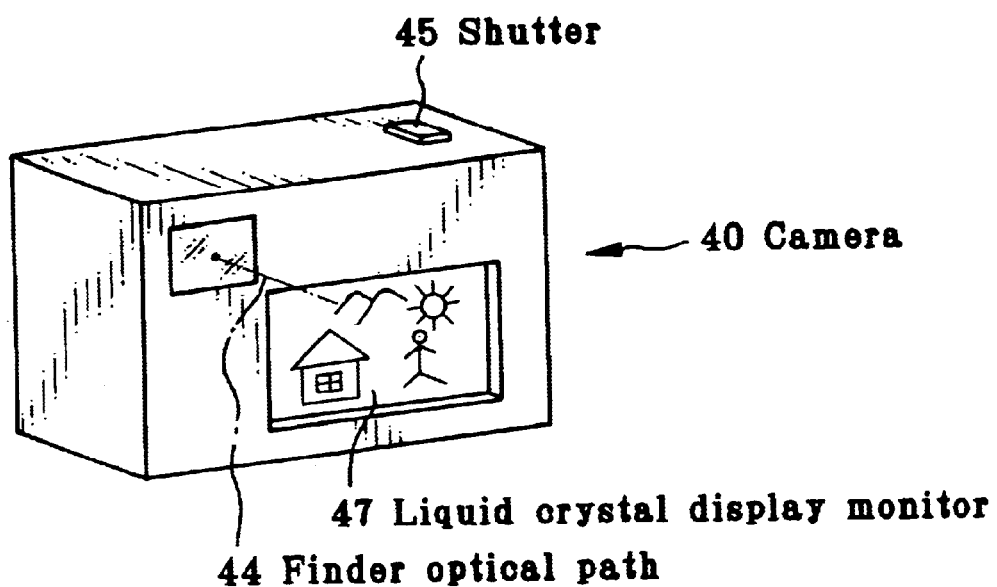
FIG. 16 is a rear perspective view of the FIG. 15 digital camera.
Figure 17:
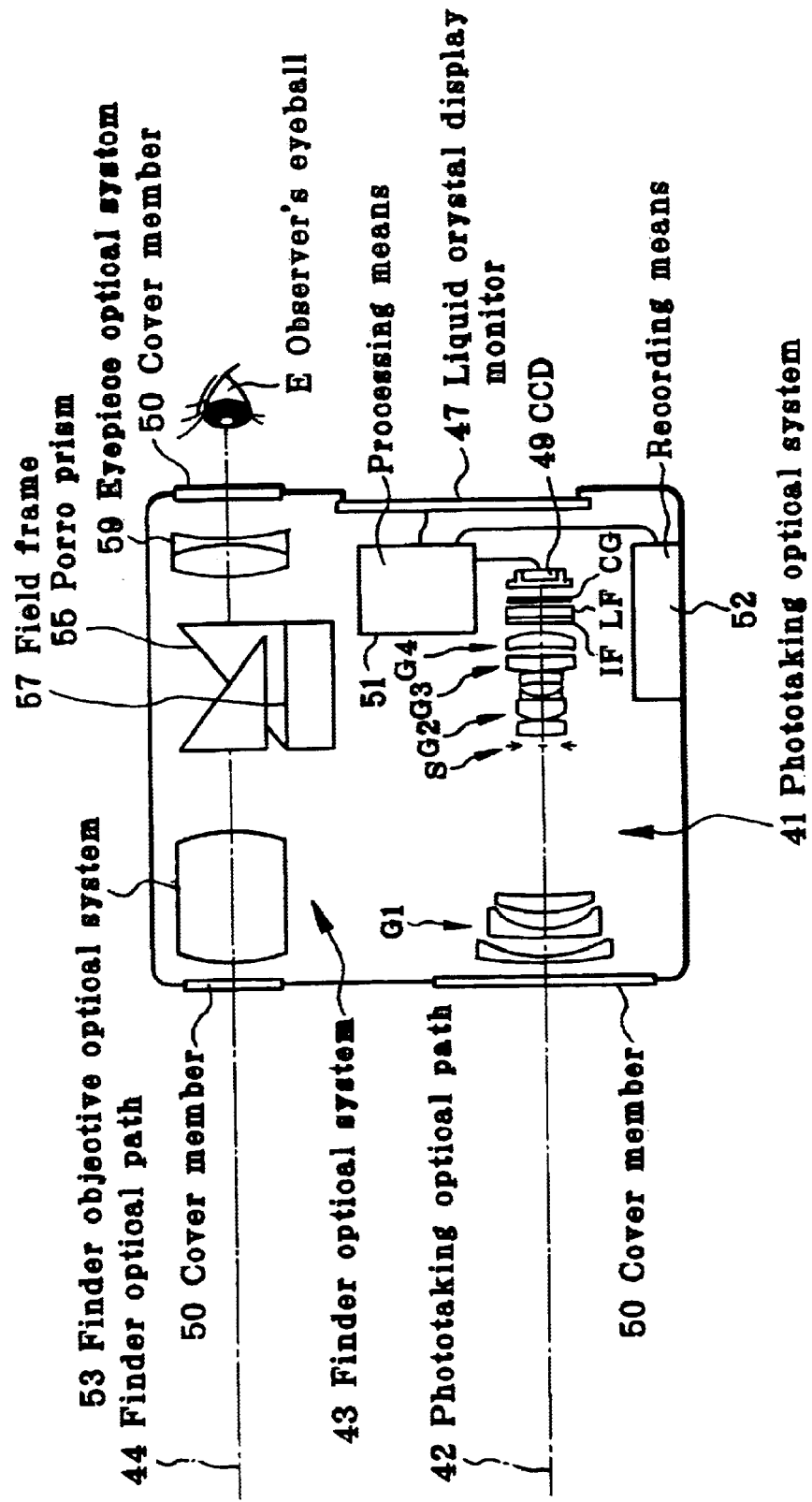
FIG. 17 is a sectional view of the FIG. 15 digital camera.
Figure 18:
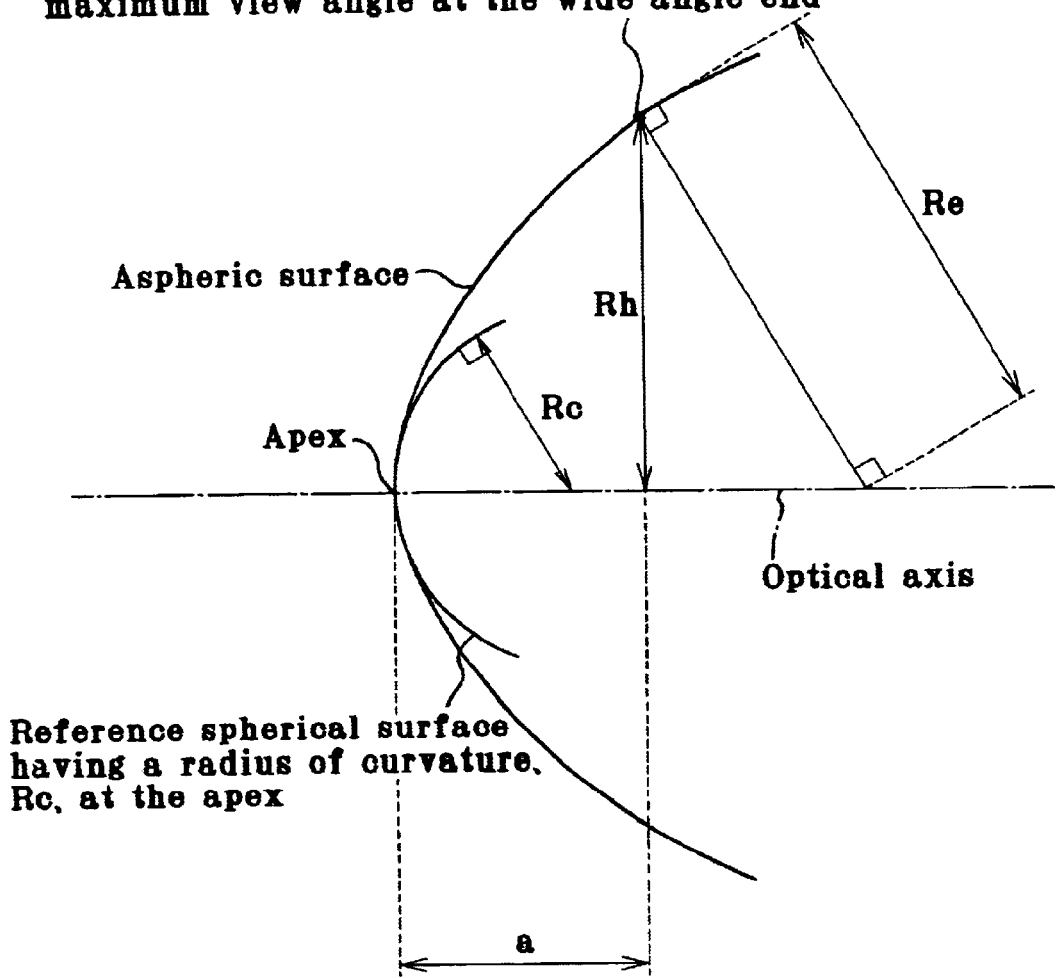
FIG. 18 is illustrative of the definitions of the parameters a, Rh, Rc and Re used in the present invention.
Figure 19:
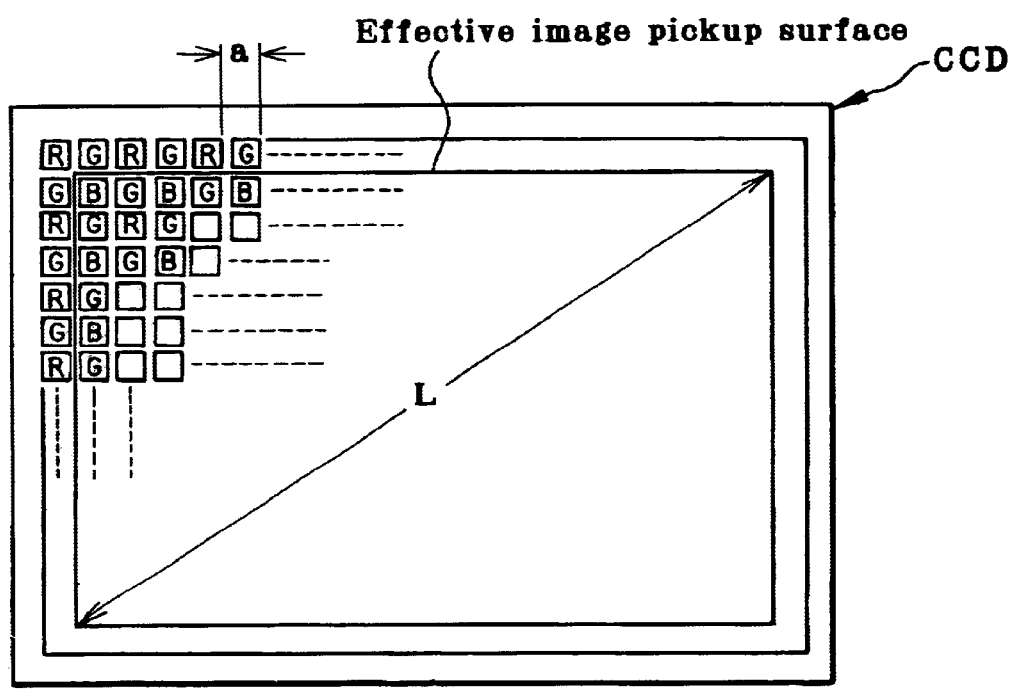
FIG. 19 is illustrative of the diagonal length of an effective image pickup surface when image shooting is carried out with an electronic image pickup device.

FIGS. 15, 16 and 17 are illustrative in conception of a phototaking optical system 41 of a digital camera, in which the zoom lens of the present invention is built. FIG. 15 and FIG. 16 are a front and a rear perspective view of the outward appearance of a digital camera 40, respectively, and FIG. 17 is a sectional view of the makeup of the digital camera 40. As shown, the digital camera 40 comprises a phototaking optical system 41 having a phototaking optical path 42, a finder optical system 43 having a finder optical path 44, a shutter 45, a flash 46, a liquid crystal display monitor 47, etc. Upon pressing down the shutter 45 mounted on top of the camera 40, phototaking takes place through the phototaking optical system 41, for instance, the zoom lens of Example 1. An object image formed by the phototaking optical system 41 is then formed on an image pickup surface of a CCD 49 via an infrared cut absorption filter IF obtained by applying a near infrared cut coating on a dummy transparent plane plate, an optical low-pass filter and a cover glass CG. The object image received at the CCD 49 is shown as an electronic image on the liquid crystal display monitor 47 on the back side of the camera via processing means 51. The processing means 51 is connected with recording means 52 to record phototaken electronic images. It is noted that the recording means 52 may be provided separately from the processing means 51 or, alternatively, it may be designed in such a way as to record images electronically in floppy disks, memory cards, MOs, or the like. By use of a silver-halide film instead of CCD 49, a silver-halide camera may be set up.

Further, a finder objective optical system 53 is provided on the finder optical path 44. Formed by this finder objective optical system 53, an object image is formed on a field frame 57 of a Porro prism 55 that is an image-erection member. In the rear of the Porro prism 55 there is an eyepiece optical system 59 for guiding the erected image to the eyeball E of an observer. As shown, cover members 50 are provided on the entrance sides of the phototaking optical system 41 and the finder objective optical system 53 and a cover member 50 on the exit side of the eyepiece optical system 59.

In the thus constructed digital camera 40, the phototaking optical system 41 is defined by a zoom lens that has a high zoom ratio in a wide-angle arrangement, is well corrected for aberrations and fast, and has an ample back focus that ensures space for receiving filters, etc. Accordingly, higher performance and cost reductions are achievable.

In the embodiment of FIG. 17, plane-parallel plates are used as the cover members 50; however, powered lenses may be used instead.

By developing the unheard-of design of the shape of lens surfaces used in zoom lenses, it is possible to achieve wide-angle arrangements for various zoom lenses, reductions in the number of lens components used, etc., thereby improving the performance of image pickup systems used therewith. Furthermore, it is possible to achieve a zoom lens that has a wide-angle arrangement and high zoom ratio preferable for phototaking systems using solid-state image pickup devices, and is made compact due to a reduced number of lens components used, resistant to fabrication errors and excellent in optical performance.

What we claim is:

1. An image pickup system comprising a zoom lens, wherein:

said zoom lens comprises a plurality of lens groups including a lens group having negative power and a lens group having positive power wherein, for zooming, the spaces between the respective lens groups are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.51 \leq a/Rh < 2.50 \quad (1)$$

$$0.30 < Rc/R < 0.95 \quad (2)$$

where a is an absolute value of an axial distance from an apex of the aspheric surface (a point of intersection of the aspheric surface with the optical axis) to a position on the aspheric surface through which a chief ray passes at a maximum view angle at an wide-angle end of the zoom lens, Rh is an absolute value of a distance between the optical axis and a position on the aspheric surface through which an off-axis chief ray passes at a maximum view angle at the wide-angle end, Rc is an absolute value of a radius of curvature at the apex (an axial radius of curvature of the aspheric surface), and R is an absolute value of a radius of curvature of a spherical surface having an axis of symmetry defined by the optical axis and including an apex and a position on the aspheric surface through which a chief ray farthest off the optical axis passes, as represented by $R = |(a^2 + Rh^2)/(2a)|$.

2. An image pickup system comprising a zoom lens, wherein:

said zoom lens comprises a plurality of lens groups including a lens group having negative power and a lens group having positive power wherein, for zooming, the spaces between the respective lens groups are variable, a negative lens group that is located nearest to the image side of said zoom lens in lens groups having negative powers has an aspheric surface having negative power, and said aspheric surface is configured to comply with the following condition (3):

$$0.70 < Rc/Rh \leq 1.02 \quad (3)$$

where Rh is an absolute value of a distance between an optical axis of the zoom lens and a position on the aspheric surface through which an off-axis chief ray passes at a maximum view angle at a wide-angle end of the zoom lens, and Rc is an absolute value of a radius of curvature at the apex (an axial radius of curvature of the aspheric surface).

3. An image pickup system comprising a zoom lens, wherein:

said zoom lens comprises a plurality of lens groups including a lens group having negative power and a lens group having positive power wherein, for zooming, the spaces between the respective lens groups are variable, a negative lens group that is located nearest to the image side of said zoom lens in lens groups having negative powers has an aspheric surface having negative power, and said aspheric surface is configured to comply with the following condition (4):

$$1.3 < Re/Rc < 1.6 \quad (4)$$

where Rc is an absolute value of a radius of curvature at an apex (an axial radius of curvature of the aspheric surface), and Re is an absolute value of a distance from a position on the aspheric surface through which an off-axis chief ray passes at a maximum view angle at an wide-angle end of the zoom lens to a point on the normal where a distance between the normal to the surface at said position and the optical axis becomes shortest.

4. The image pickup system according to claim 1, wherein a relative distance between said stop and said aspheric surface is shorter at a telephoto end of the zoom lens than at the wide-end of the zoom lens.

5. The image pickup system according to claim 1, wherein said zoom lens comprises, in order from an object side thereof, a first lens group having negative power and a subsequent lens group that has generally positive power, and said aspheric surface is incorporated in said first lens group.

6. The image pickup system according to claim 5, wherein said subsequent lens group consists of, in order from the object side of the zoom lens, a second lens group having positive power and a third lens group having positive power, and upon zooming from a wide-angle end to a telephoto end of the zoom lens, a space between the first lens group and the second lens group becomes narrow, and said stop is interposed between said first lens group and said third lens group.

7. An image pickup system comprising a zoom lens, wherein:

said zoom lens comprises a plurality of lens groups including a lens group having negative power and a lens group having positive power wherein, for zooming, the spaces between the respective lens groups are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.30 < a/Rh < 2.5 \quad (1)$$
$$0.30 < Rc/R < 0.95 \quad (2)$$

where a is an absolute value of an axial distance from an apex of the aspheric surface (a point of intersection of the aspheric surface with the optical axis) to a position on the aspheric surface through which a chief ray passes at a maximum view angle at an wide-angle end of the zoom lens, Rh is an absolute value of a distance between the optical axis and a position on the aspheric surface through which an off-axis chief ray passes at a maximum view angle at the wide-angle end, Rc is an absolute value of a radius of curvature at the apex (an axial radius of curvature of the aspheric surface), and R is an absolute value of a radius of curvature of a spherical surface having an axis of symmetry defined by the optical axis and including an apex and a position on the aspheric surface through which a chief ray farthest off the optical axis passes, as represented by $R = |(a^2 + Rh^2)/(2a)|$, wherein said zoom lens comprises, in order from an object side thereof, a first lens group having negative power and a subsequent lens group that has generally positive power, and said aspheric surface is incorporated in said first lens group; and wherein said subsequent lens group comprises, in order from the object side of the zoom lens, a second lens group having positive power, a third lens group having positive power and a fourth lens group having positive or negative power, and said stop is interposed between said first lens group and third lens group.

8. The image pickup system according to claim 1, wherein:

said zoom lens comprises, in order from the object side thereof, a first lens group having negative power, an aperture stop, a second lens group having positive power and a third lens group having positive power, said first lens group, and said second lens group have an aspheric lens element, said first lens group comprises at least one negative meniscus lens element convex on an object side thereof and a positive lens element, and said second lens group comprises a doublet component consisting of a positive lens element and a negative lens element and a positive lens component.

9. An image pickup system comprising a zoom lens, wherein:

said zoom lens comprises a plurality of lens groups including a lens group having negative power and a lens group having positive power wherein, for zooming, the spaces between the respective lens groups are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.30 < a/Rh < 2.5 \quad (1)$$
$$0.30 < Rc/R < 0.95 \quad (2)$$

where a is an absolute value of an axial distance from an apex of the aspheric surface (a point of intersection of the aspheric surface with the optical axis) to a position on the aspheric surface through which a chief ray passes at a maximum view angle at an wide-angle end of the zoom lens, Rh is an absolute value of a distance between the optical axis and a position on the aspheric surface through which an off-axis chief ray passes at a maximum view angle at the wide-angle end, Rc is an absolute value of a radius of curvature at the apex (an axial radius of curvature of the aspheric surface), and R is an absolute value of a radius of curvature of a spherical surface having an axis of symmetry defined by the optical axis and including an apex and a position on the aspheric surface through which a chief ray farthest off the optical axis passes, as represented by $R = |(a^2 + Rh^2)/(2a)|$, wherein said zoom lens comprises, in order from an object side thereof, a first lens group having negative power, an aperture stop, a second lens group having positive power and a third lens group having positive power, said first lens group comprises at least one negative element convex on its object side and a positive lens element, and said second lens group comprises a doublet component consisting of a positive lens element and a negative lens element and two positive lens components.

10. The image pickup system according to claim 8, wherein said third lens group comprises a positive element that satisfies the following condition (5):

$$\nu_3 > 49 \tag{5}$$

where $\nu_3$ is a d-line reference Abbe number of any of positive lens elements included in the third lens group.

11. The image pickup system according to claim 8, wherein said third lens group comprises a negative lens element and a positive lens element.

12. The image pickup system according to claim 8, wherein said the doublet component in said second lens group is configured to satisfy the following condition (6):

$$0.6 < R_{23}/R_{21} < 1.0 \tag{6}$$

where $R_{21}$ is a radius of curvature of a side of the doublet component, which is located nearest to the object side of the zoom lens, and $R_{23}$ is a radius of curvature of a side of the doublet component, which is located nearest to the image plane side of the zoom lens.

13. The image pickup system according to claim 12, wherein a cemented surface of the doublet component in said second lens group is configured to satisfy the following condition (7):

$$-0.1 < f_W/R_{22} < 0.2 \tag{7}$$

where $R_{22}$ is a radius of curvature of the cemented surface of the doublet component, and $f_W$ is a focal length of the zoom lens at a wide-angle end thereof.

14. The image pickup system according to claim 12, which satisfies the following condition (8):

$$2.6 < f_2/f_W < 4.0 \tag{8}$$

where $f_2$ is a focal length of the second lens group, and $f_W$ is a focal length of the zoom lens at a wide-angle end thereof.

15. The image pickup system according to claim 12, which satisfies the following condition (9):

$$2.0 < |f_1|/Y < 5.0 \tag{9}$$

where $f_1$ is a focal length of the first lens group, and Y is one-half of an effective diagonal length of an image pickup surface.

16. The image pickup system according to claim 12, wherein an electronic image pickup device is located on the image plane side of said zoom lens, and which satisfies the following condition (10):

$$0.7 < f_W/ER_3 < 1.2 \tag{10}$$

where $f_W$ is a focal length of the zoom lens at a wide-angle end thereof, and $ER_3$ is a distance from the optical axis to a point where at the lens group located nearest to the image side of the zoom lens a light ray is farthest off the optical axis at a telephoto end of the zoom lens.

17. The image pickup system according to claim 1, wherein said zoom lens comprises, in order from an object side thereof, a first lens group having positive power, a second lens group having negative power and a subsequent lens group having generally positive refracting power, and upon zooming from the object side to a telephoto end of the zoom lens, a space between said first lens group and said second lens group becomes wide, with said aspheric surface incorporated in said second lens group.

18. An image pickup system comprising a zoom lens, wherein:

said zoom lens comprises a plurality of lens groups including a lens group having negative power and a lens group having positive power wherein, for zooming, the spaces between the respective lens groups are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.30 < a/Rh < 2.5 \tag{1}$$

$$0.30 < Rc/R < 0.95 \tag{2}$$

where a is an absolute value of an axial distance from an apex of the aspheric surface (a point of intersection of the aspheric surface with the optical axis) to a position on the aspheric surface through which a chief ray passes at a maximum view angle at an wide-angle end of the zoom lens, Rh is an absolute value of a distance between the optical axis and a position on the aspheric surface through which an off-axis chief ray passes at a maximum view angle at the wide-angle end, Rc is an absolute value of a radius of curvature at the apex (an axial radius of curvature of the aspheric surface), and R is an absolute value of a radius of curvature of a spherical surface having an axis of symmetry defined by the optical axis and including an apex and a position on the aspheric surface through which a chief ray farthest off the optical axis passes, as represented by $R = |(a^2 + Rh^2)/(2a)|$, wherein said subsequent zoom lens group comprises, in order from an object side thereof, a third lens group having positive power and a fourth lens group having positive or negative power, and upon zooming from the wide-angle end to the telephoto end of the zoom lens, the space between said second lens group and said third lens group becomes narrow, with said stop inserted between said second lens group and said fourth lens group.

19. The image pickup system according to claim 1, wherein the negative lens component including said aspheric surface is a negative meniscus lens element that is convex on a side thereof facing away from said stop.

20. The image pickup system according to claim 1, wherein the negative lens group including said aspheric surface comprises one positive lens element that is concave on a side thereof facing said stop and one or two negative lens elements.

21. The image pickup system according to claim 1, wherein a half view angle of said zoom lens at the wide-angle end thereof is greater than 35°.

22. An image pickup system comprising a zoom lens, wherein said zoom lens comprises a plurality of lens groups including a lens group having negative power and a lens group having positive power wherein, for zooming, the spaces between the respective lens group are variable, said zoom lens further comprises an aperture stop, at least one lens group having negative power comprises a negative lens component having an aspheric concave surface on the side of said aperture stop, and said aspheric surface is configured to have refracting power that becomes weak with an increasing distance from an optical axis of the zoom lens and complies with the following conditions (1) and (2):

$$0.30 < a/Rh < 2.5 \quad (1)$$

$$0.30 < Rc/R < 0.95 \quad (2)$$

where a is an absolute value of an axial distance from an apex of the aspheric surface ( a point of intersection of the aspheric surface with the optical axis) to a position on the aspheric surface through which a chief ray passes at a maximum view angle at an wide-angle end of the zoom lens, Rh is an absolute value of a distance between the optical axis and a position on the aspheric surface through which an off-axis chief ray passes at a maximum view angle at the wide-angle end, Rc is an absolute value of a radius of curvature at the apex (an axial radius of curvature of the aspheric surface, and R is an absolute value of a radius of curvature of a spherical surface having an axis of symmetry defined by the optical axis and including an apex and a position on the aspheric surface through which a chief ray farthest off the optical axis passes, and represented by $R = |a^2 + Rh^2)/(2a)|$, wherein a negative lens group that is located nearest to the image side of said zoom lens in lens groups having negative powers has an aspheric surface having negative power, and said aspheric surface is configured to comply with the following:

$$0.70 < Rc/Rh \leq 1.23$$

where Rh is an absolute value of a distance between an optical axis of the zoom lens and a position on the aspheric surface through which an off-axis chief ray passes at a maximum view angle at a wide-angle end of the zoom lens, and Rc is an absolute value of a radius of curvature at the apex (an axial radius of curvature of the aspheric surface).

* * * * *